US012322857B2

(12) United States Patent
Wei et al.

(10) Patent No.: US 12,322,857 B2
(45) Date of Patent: Jun. 3, 2025

(54) ANTENNA ARCHITECTURE FOR A WEARABLE DEVICE AND RELATED DEVICES AND METHODS

(71) Applicant: Meta Platforms Technologies, LLC, Menlo Park, CA (US)

(72) Inventors: Yonghua Wei, San Diego, CA (US); Ulf Jan-Ove Mattsson, Campbell, CA (US); Geng Ye, Union City, CA (US); Bruno Cendon Martin, Palo Alto, CA (US); Derek William Wright, San Francisco, CA (US); Nishant Srinivasan, San Francisco, CA (US); Joung Sub Shin, Irvine, CA (US)

(73) Assignee: Meta Platforms Technologies, LLC

( * ) Notice: Subject to any disclaimer, the term of this patent is extended or adjusted under 35 U.S.C. 154(b) by 316 days.

(21) Appl. No.: 17/687,331

(22) Filed: Mar. 4, 2022

(65) Prior Publication Data

US 2023/0282962 A1 Sep. 7, 2023

(51) Int. Cl.

| | |
|---|---|
| ***H01Q 1/24*** | (2006.01) |
| ***H01Q 1/27*** | (2006.01) |
| ***H01Q 5/371*** | (2015.01) |
| ***H01Q 9/04*** | (2006.01) |
| ***H01Q 13/10*** | (2006.01) |

(52) U.S. Cl.

CPC ............. *H01Q 1/243* (2013.01); *H01Q 1/273* (2013.01); *H01Q 5/371* (2015.01); *H01Q 9/0421* (2013.01); *H01Q 13/10* (2013.01)

(58) Field of Classification Search

CPC ........ H01Q 1/243; H01Q 5/371; H01Q 1/273; H01Q 9/0421; H01Q 13/10

See application file for complete search history.

(56) References Cited

U.S. PATENT DOCUMENTS

| | | | | |
|---|---|---|---|---|
| 10,355,344 | B1 * | 7/2019 | Ruaro ...................... | H01Q 3/24 |
| 2018/0048057 | A1 | 2/2018 | Ehman et al. | |
| 2021/0033714 | A1 | 2/2021 | Nath et al. | |

OTHER PUBLICATIONS

International Search Report and Written Opinion for International Application No. PCT/US2023/014335, mailed Jun. 9, 2023, 15 pages.

(Continued)

*Primary Examiner* — Graham P Smith

(74) *Attorney, Agent, or Firm* — FOLEY & LARDNER LLP

(57) ABSTRACT

The disclosed mobile electronic device may include a display, an enclosure supporting the display and comprising a conductive portion, a ground plane positioned within the enclosure, wherein a gap defined between the conductive portion of the enclosure and the ground plane forms a slot antenna that is configured to radiate first electromagnetic signals through a portion of the display, the first electromagnetic signals radiated by the slot antenna being used for wireless communication in a first wireless communication band, and a patch antenna, comprising a substantially planar conductor, that is configured to radiate second electromagnetic signals, the second electromagnetic signals radiated by the patch antenna being used for wireless communication in a second wireless communication band different from the first wireless communication band. Various other related methods and systems are also disclosed.

19 Claims, 22 Drawing Sheets

(56) References Cited

OTHER PUBLICATIONS

International Preliminary Report on Patentability for International Application No. PCT/US2023/014335, mailed Sep. 19, 2024, 14 pages.

* cited by examiner

ANTENNA ARCHITECTURE FOR A WEARABLE DEVICE AND RELATED DEVICES AND METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
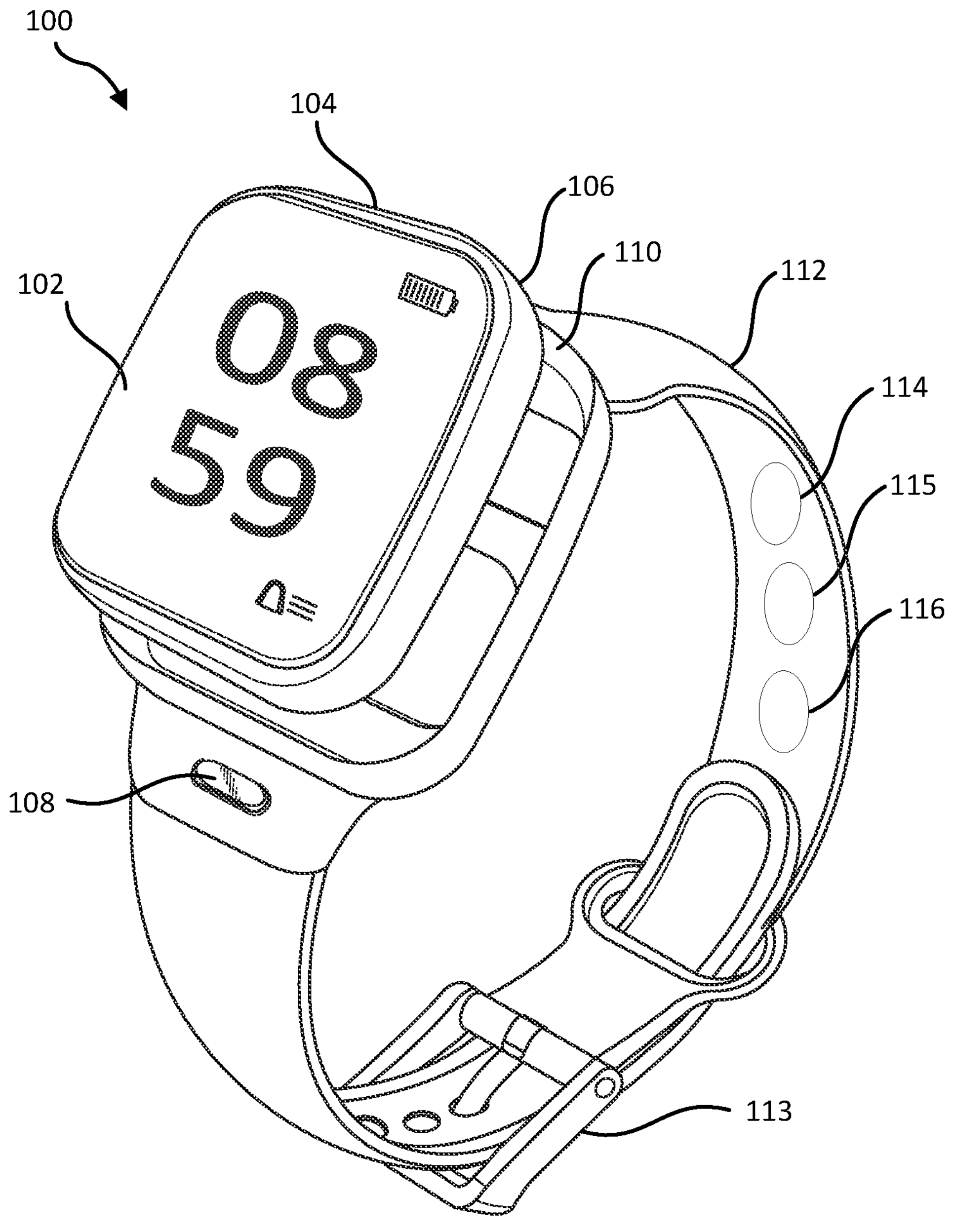
FIG. 1 is a perspective view of an example wristband system, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Wearable devices (e.g., a wristband system) may be configured to be worn on a user's body part, such as a user's wrist, arm, leg, torso, neck, head, finger, etc. Such wearable devices may be configured to perform various functions. For example, a wristband system may be an electronic device worn on a user's wrist that performs functions such as delivering content to the user, executing social media applications, executing artificial-reality applications, messaging, web browsing, sensing ambient conditions, interfacing with head-mounted displays, monitoring a health status of the user, etc. Many of the functions of the wearable device may require wireless communications to exchange data with other devices, servers, etc. However, since wearable devices are typically worn on a body part (e.g., a wrist, an ankle, etc.) of a user, the body part of the user may negatively affect the performance of the wireless communications by absorbing or altering wireless signals. Additionally, the compact size of wearable devices may restrict the physical dimensions of antennas and create challenges in antenna architecture that may affect wireless communication performance.

The present disclosure details systems, devices, and methods related to an antenna architecture of a mobile electronic device (e.g., a wearable device, a smartwatch, a wristband system, etc.). The antenna architecture may include multiple antennas that enable wireless communication for the mobile electronic device. The multiple antennas may include a slot antenna, a patch antenna, a trace antenna, a branch antenna, an enclosure antenna, or any combination thereof. The antenna architecture may include a radio frequency (RF)

transceiver and a dynamic tuner. The dynamic tuner may include an impedance tuning circuit and/or an aperture tuning circuit that broadens antenna frequency bandwidth coverage and compensates for antenna loss when the mobile electronic device is proximate to a user. In some examples, a proximity sensor may detect the proximity of the electronic device to a user to facilitate matching the impedance of the antennas to the impedance of an RF circuit driving the antennas. This impedance tuning circuit and/or aperture tuning circuit may improve the performance of the antennas and the overall performance of the wireless communications.

In some embodiments, the wearable device may include a wristband system that includes a watch band that detachably couples to a watch body. The watch body may include a coupling mechanism for electrically and mechanically coupling the watch body to the watch band. The wristband system may have a split architecture that allows the watch band and the watch body to operate both independently and in communication with one another. The mechanical architecture may include a coupling mechanism on the watch band and/or the watch body that allows a user to conveniently attach and detach the watch body to and from the watch band. When a user decouples the watch body from the watch band, the proximity sensor may detect the proximity of the electronic device to the user for matching the impedance of the antennas to the impedance of a circuit driving the antennas.

The following will provide, with reference to FIGS. 1-22, detailed descriptions of antenna architectures for a wearable device including related devices and methods. First, a description of a wristband system including a watch band, a watch body, and a method of decoupling the watch body from the watch band is presented in reference to FIG. 1. A description of a user donning a wearable device is presented in reference to FIG. 2. A description of a user holding a watch body detached from a watch band is presented in reference to FIG. 3. A description of a high-level architecture of an example RF circuit is presented in reference to FIG. 4. A description of a block diagram of an RF circuit for driving and tuning antennas in a wearable device is presented in reference to FIG. 5. A description of external features of a watch body is presented in reference to FIGS. 6A and 6B. A description of internal components associated with antenna architectures of wearable devices is presented in reference to FIGS. 7-16. A method of manufacturing an antenna system for a wearable device is presented in reference to FIG. 17. A description of various types of example artificial-reality devices that may be used with a wearable device is presented in reference to FIGS. 18-22.

FIG. 1 illustrates a perspective view of an example wearable device in the form of a wristband system 100 that includes a watch body 104 decoupled from an associated watch band 112. Watch body 104 and watch band 112 may have a substantially rectangular or circular shape and may be configured to allow a user to wear wristband system 100 on a body part (e.g., a wrist). Wristband system 100 may include a retaining mechanism 113 (e.g., a buckle, a hook and loop fastener, etc.) for securing watch band 112 to the user's wrist. Wristband system 100 may also include a coupling mechanism 106 for detachably coupling watch body 104 to watch band 112. The wristband system 100 may be configured to execute functions, such as, without limitation, displaying visual content to the user (e.g., visual content displayed on display screen 102), sensing user input (e.g., sensing a touch on button 108, sensing biometric data on sensor 114, sensing neuromuscular signals on neuromuscular sensor 115, etc.), messaging (e.g., text, speech, video, etc.), capturing images, determining location, performing financial transactions, providing haptic feedback, performing wireless communications (e.g., Long Term Evolution (LTE), cellular, near field, wireless fidelity (WiFi), Bluetooth™ (BT), personal area network), etc. The wireless communications functions may be executed using a slot antenna, a trace antenna, a patch antenna, a branch antenna, an enclosure antenna(s) or a combination thereof, as described in detail below with reference to FIGS. 2-17. Wristband system 100 functions may be executed independently in watch body 104, independently in watch band 112, and/or in communication between watch body 104 and watch band 112. Functions may be executed on wristband system 100 in conjunction with an artificial-reality system such as the artificial-reality systems described with reference to FIGS. 18-22.

Watch band 112 may be configured to be worn by a user such that an inner surface of watch band 112, an inner surface of watch body 104, and/or watch band coupling mechanism(s) 110 may be in contact with the user's skin. Sensor 114 may be a biosensor that is configured to sense a user's heart rate, saturated oxygen level, temperature, sweat level, muscle intentions, or a combination thereof. Watch band 112 may include multiple sensors 114 that may be distributed on an inside and/or an outside surface of watch band 112. Additionally or alternatively, watch body 104 may include the same or different sensors than watch band 112. For example, multiple sensors may be distributed on an inside and/or an outside surface of watch body 104. As described below with reference to FIG. 4, sensor 114 may detect whether watch body 104 is worn by a user (e.g., disposed next to a user skin) or watch body 104 is away from the user's wrist. An RF tuning circuit and/or a processor may read the status of sensor 114 and tune at least one antenna of watch body 104 to adjust wireless communications settings (e.g., a center frequency) based on whether the user is wearing watch body 104.

Watch body 104 may include, without limitation, a proximity sensor (e.g., a sensor to determine a proximity to a human and/or proximity to watch band 112), a front facing image sensor, a rear-facing image sensor, a biometric sensor, an inertial measurement unit, a heart rate sensor, a saturated oxygen sensor, a neuromuscular sensor, an altimeter sensor, a temperature sensor, a bioimpedance sensor, a pedometer sensor, an optical sensor, a touch sensor, a sweat sensor, or any combination or subset thereof. Sensor 114 may also include a sensor that provides data about a user's environment including a user's motion (e.g., an inertial measurement unit), altitude, location, orientation, gait, or a combination thereof. Watch band 112 may transmit the data acquired by sensor 114 to watch body 104 using a wired communication method (e.g., a UART, a USB transceiver, etc.) and/or a wireless communication method (e.g., near field communication, WiFi, BT, etc.). In some examples, watch body 104 and watch band 112 may each be configured to operate whether watch body 104 is coupled to or decoupled from watch band 112. In some examples, sensor 114 may be a heart rate sensor disposed on a surface (e.g., a rear surface) of watch body 104 as shown with reference to FIGS. 6A and 6B such that the heart rate sensor detects the proximity of watch body 104 to the skin of the user when the user is wearing watch band 112 and watch body 104.

Watch band 112 and/or watch body 104 may include a haptic device 116 (e.g., a vibratory haptic actuator) that is configured to provide haptic feedback (e.g., a cutaneous and/or kinesthetic sensation, etc.) to the user's skin. Sensor 114 and/or haptic device 116 may be configured to operate in conjunction with multiple applications including, without limitation, health monitoring, social media, game playing, and artificial reality (e.g., the applications associated with artificial reality as described below with reference to FIGS. 18-22).

In some examples, watch band 112 and/or watch body 104 may include a neuromuscular sensor 115 (e.g., an electromyography (EMG) sensor, a mechanomyogram (MMG) sensor, a sonomyography (SMG) sensor, etc.). Neuromuscular sensor 115 may sense a user's muscle intention. The sensed muscle intention may be transmitted to an artificial-reality (AR) system (e.g., augmented reality system 1800 of FIG. 18, virtual-reality system 1900 of FIG. 19, head-mounted display 2102 of FIG. 21, or augmented-reality glasses 2220 in FIG. 22) to perform an action in an associated artificial-reality environment, such as to control the motion of a virtual device displayed to the user. Further, the artificial-reality system may provide haptic feedback to the user in coordination with the artificial-reality application via haptic device 116. In some examples, neuromuscular sensor 115 may sense a proximity of watch body 104 to the skin of the user when the user is wearing watch band 112 and watch body 104.

Wristband system 100 may include a coupling mechanism for detachably coupling watch body 104 to watch band 112. A user may detach watch body 104 from watch band 112 in order to reduce the encumbrance of wristband system 100 to the user. Wristband system 100 may include a watch body coupling mechanism(s) 106 and/or watch band coupling mechanism(s) 110 (e.g., a cradle, a tracker band, a support base, a clasp). A user may perform any type of motion to couple watch body 104 to watch band 112 and to decouple watch body 104 from watch band 112. For example, a user may twist, slide, turn, push, pull, or rotate watch body 104 relative to watch band 112, or a combination thereof, to attach watch body 104 to watch band 112 and to detach watch body 104 from watch band 112.

Figure 2:
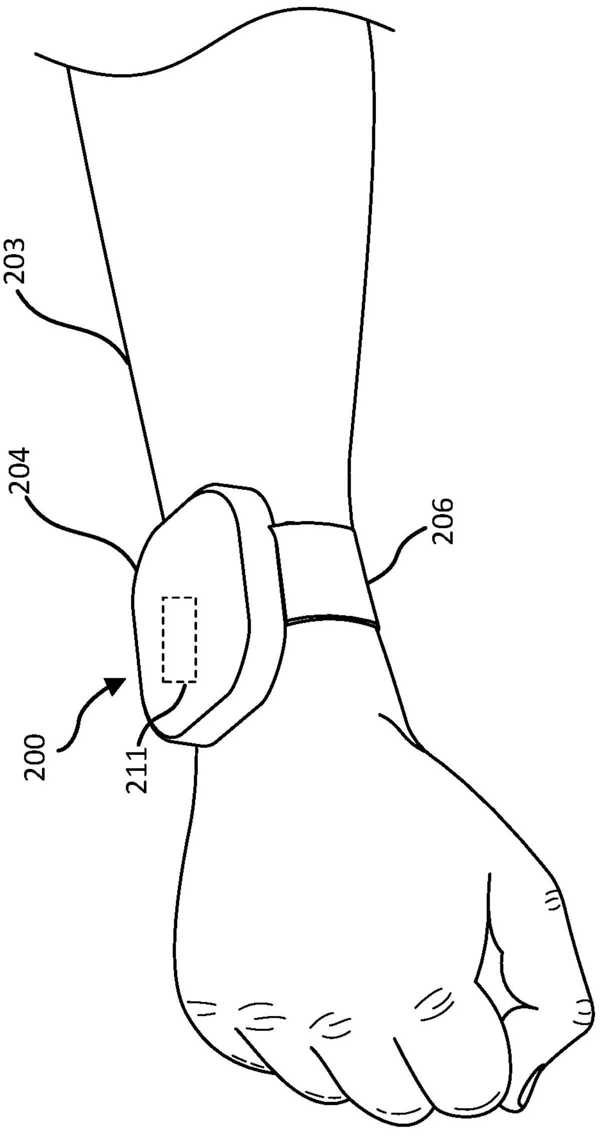
FIG. 2 is a perspective view of a user wearing an example wristband system, according to at least one embodiment of the present disclosure.
Figure 3:
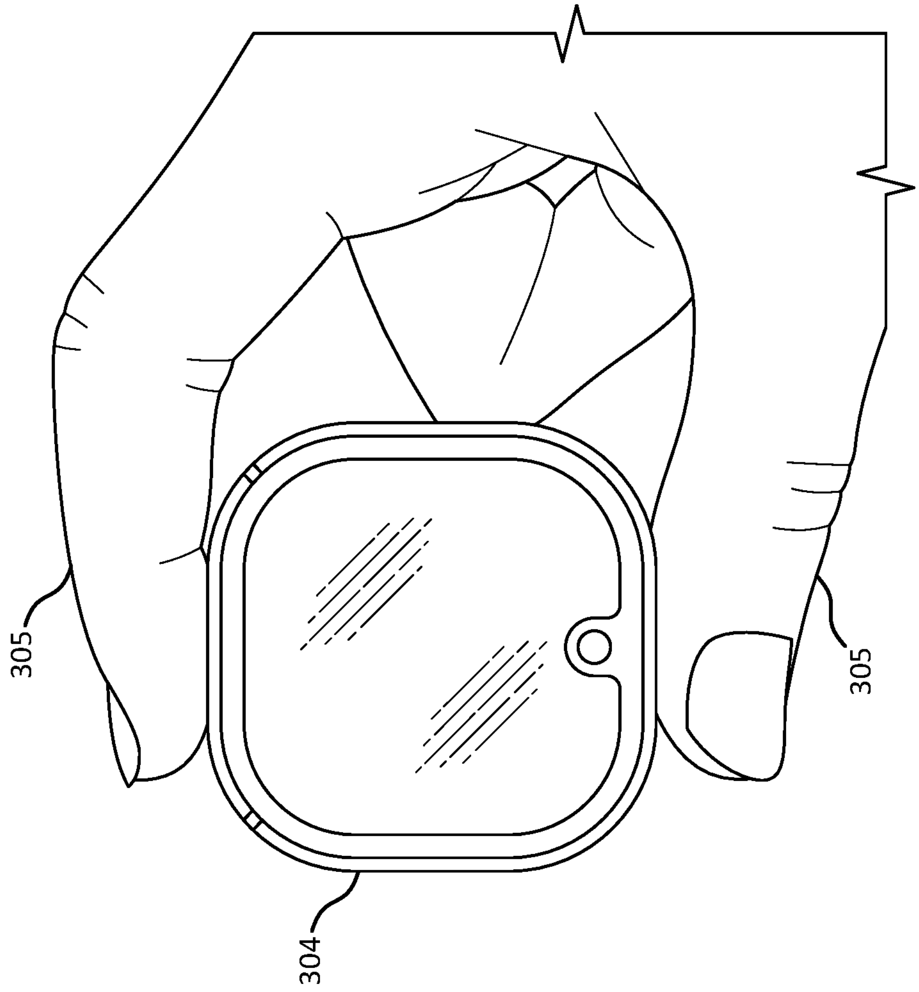
FIG. 3 is a plan view of a user holding a watch body of an example wristband system, according to at least one embodiment of the present disclosure.

FIG. 2 is a perspective view of a user wearing a wristband system 200, according to at least one embodiment of the present disclosure. A user may wear wristband system 200 on any body part. For example, a user may wear wristband system 200 on a forearm 203. The user may operate watch body 204 while wearing wristband system 200 or while watch body 204 is detached from the user as shown in FIG. 3 (e.g., the user detaches watch body 204 from a wristband 206 of wristband system 200 or the user removes wristband system 200 from forearm 203). Watch body 204 may include a wireless communication unit. The performance of the wireless communication unit may depend on the proximity of watch body 204 to the user. Electromagnetic distortion of the radio waves transmitted and received by watch body 204 may be caused by interaction with human body tissue in a user (e.g., forearm 203 of the user). Performance of the antennas (e.g., slot antenna, trace antenna, patch antenna, branch antenna, and/or enclosure antenna) operating in close proximity to a user may be degraded due to losses caused by varying electric properties of human tissues, resulting in distortion of the radiation pattern, reduction in radiation efficiency, and de-tuning of antenna impedance. As described above with reference to FIG. 1, a proximity sensor (e.g., sensor 114) may determine the proximity of watch body 204 to the user's forearm 203, to the user's skin, and/or to wristband 206. In some examples, watch body 204 may include an RF circuit 211 configured to tune the antennas (e.g., slot antenna, trace antenna, patch antenna, branch antenna, and/or enclosure antenna) and to compensate for the performance loss due to the proximity to the user. RF circuit 211 may compensate for the performance loss due to the proximity to the user by matching the impedance of the antenna to the impedance of RF circuit 211.

FIG. 3 is a plan view of a user holding a watch body 304 of an example wristband system, according to at least one embodiment of the present disclosure. In some examples, a user may detach watch body 304 from a watch band as described above with reference to FIG. 1. The user may hold watch body 304 between user's fingers 305. While holding watch body 304, the user may interface with watch body 304 to perform functions such as delivering content to the user, executing social media applications, taking pictures, executing artificial-reality applications, wirelessly communicating, messaging, web browsing, etc. Many of the functions of watch body 304 may require wireless communications to exchange data with other devices, servers, etc. Since watch body 304 may operate in multiple environments (e.g., between the user's fingers 305, in the palm of a user, on a surface, attached to a watch band or other accessories [such as a selfie stick, bike mount, etc.], in a user's pocket, etc.) the performance of the wireless communications may be affected by the absorption and/or alteration of the wireless signals depending on the environment and/or proximity to the user. In some examples, watch body 304 may include an RF circuit that is configured to tune the antennas (e.g., slot antenna, trace antenna, patch antenna, branch antenna, and/or enclosure antenna) to compensate for the performance loss due to the environment.

Figure 4:
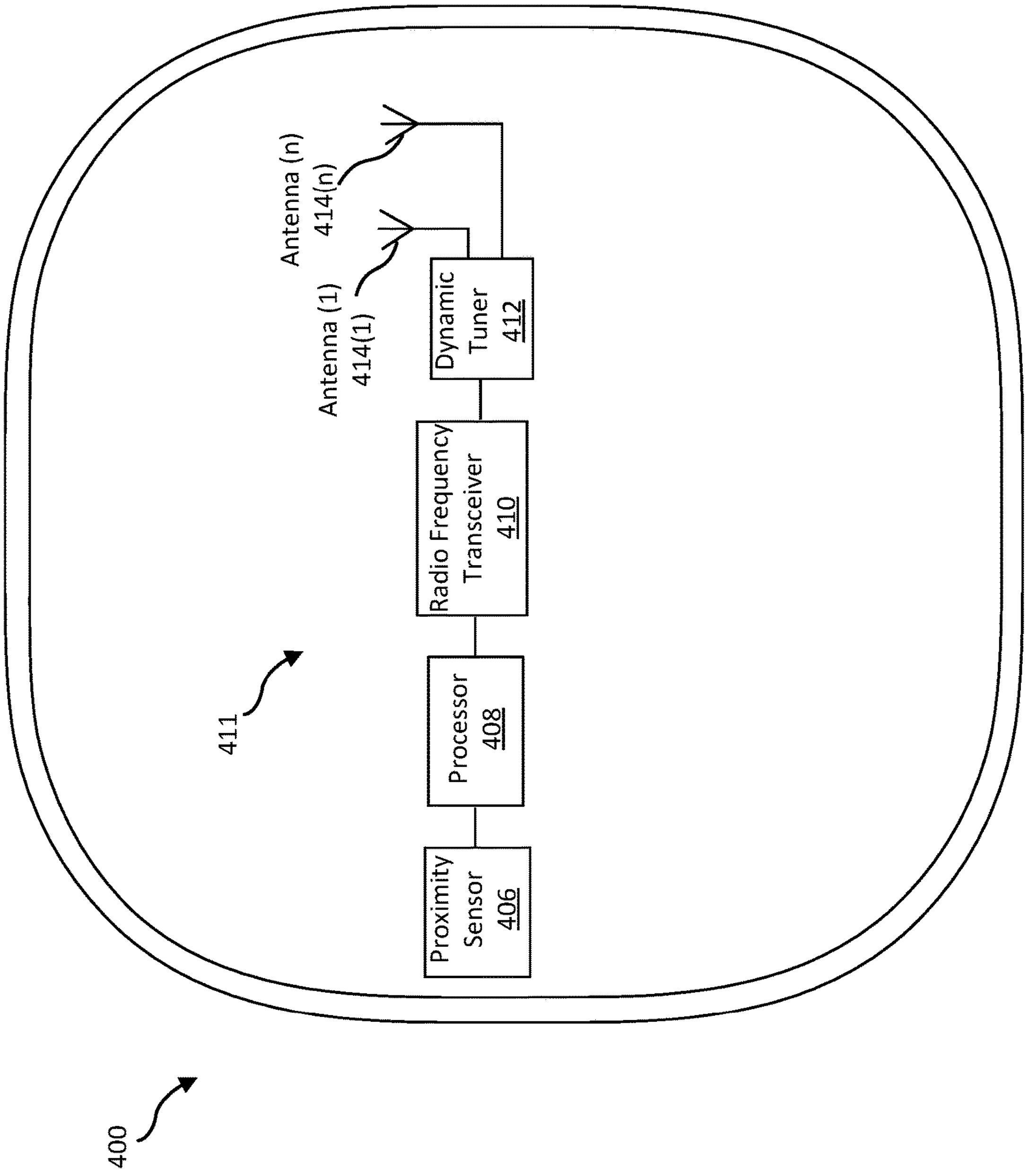
FIG. 4 is a high-level architecture diagram of an example radio frequency circuit of a watch body, according to at least one embodiment of the present disclosure.

FIG. 4 is a high-level architecture diagram of an example RF circuit 411 of a watch body 400. As described above with reference to FIG. 3, watch body 400 may compensate for the environment in which it is operating by tuning antennas to improve the performance of wireless communications. Watch body 400 may include a proximity sensor 406. Proximity sensor 406 may determine a proximity of watch body 400 to a human and/or a proximity to a watch band (e.g., watch band 112 of FIG. 1). Watch body 400 may include multiple proximity sensors 406. Proximity sensor 406 may be of any type of sensor capable of obtaining data for determining whether watch body 400 is coupled to and/or adjacent to another object or device. For example, proximity sensor 406 may include, without limitation, a heart rate monitor sensor, an image sensor, a biometric sensor, an inertial measurement sensor, a saturated oxygen sensor, a neuromuscular sensor, an inductive proximity sensor, an ultrasonic proximity sensor, or a combination thereof. Watch body 400 may include a processor 408. Processor 408 (e.g., a central processing unit, a microcontroller, MCU 558 of FIG. 5, etc.) may read the output of proximity sensor 406 to determine proximity status. Processor 408 may provide the proximity status to an RF transceiver 410. In some examples, processor 408 may process baseband signals for the wireless communications. RF transceiver 410 may process and/or convert baseband signals to radio frequency signals for transmitting and receiving over the air. RF transceiver 410 may also receive the proximity status from processor 408 and control a dynamic tuner 412 based on the status of the proximity sensor. Dynamic tuner 412 may adjust the center frequency of antennas 414(1) . . . 414(*n*) by adjusting a center frequency of antennas 414(1) . . . 414(*n*) based on the status of the proximity sensor. Dynamic tuner 412 may adjust the center frequency of antennas 414(1) . . . 414(*n*) as described in detail below with reference to FIG. 5.

Figure 5:
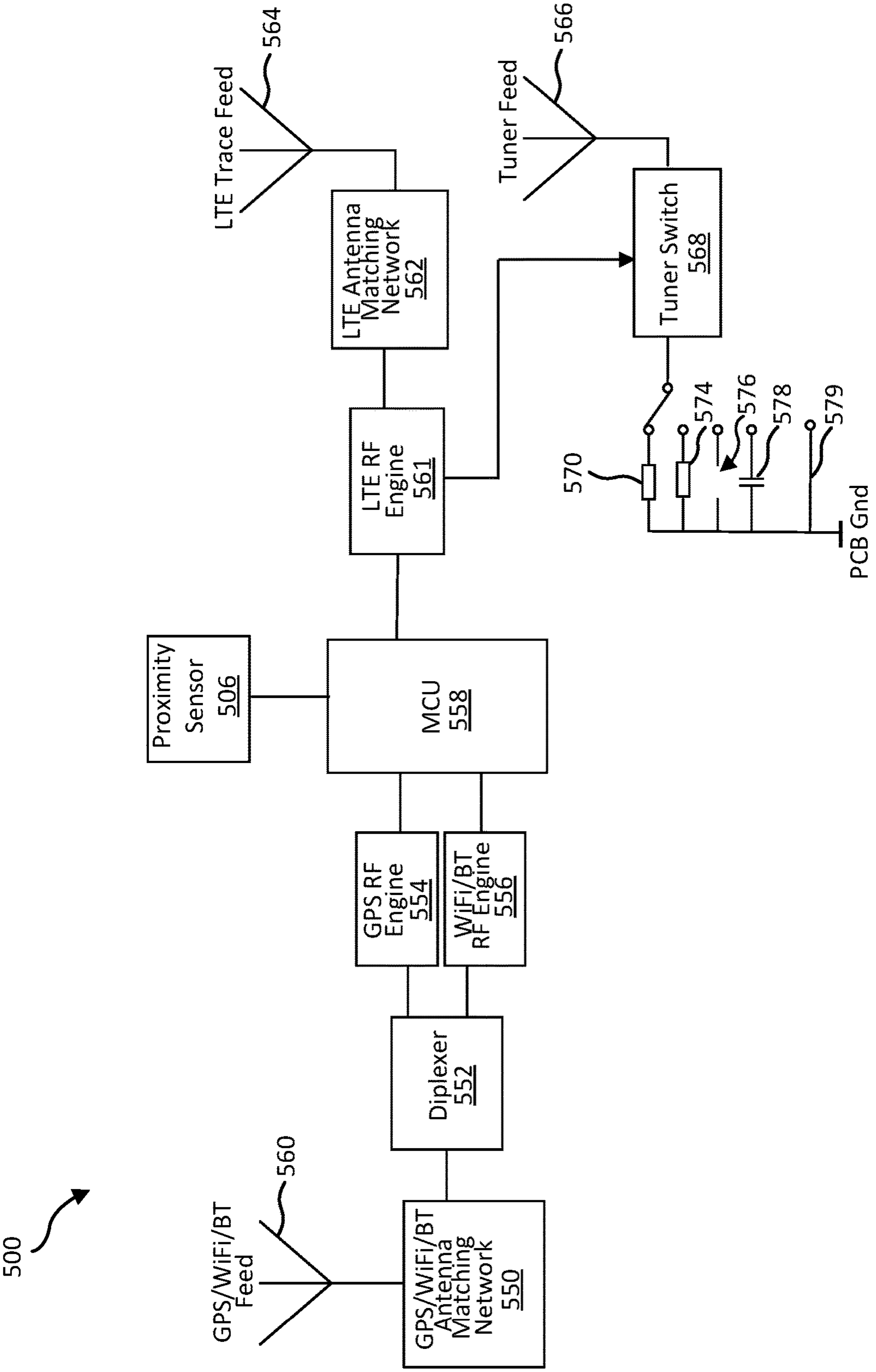
FIG. 5 is a block diagram of an example radio frequency circuit of a watch body, according to at least one embodiment of the present disclosure.

FIG. 5 is a block diagram illustrating an RF circuit 500 of a watch body, according to at least one embodiment of the present disclosure. By way of example, RF circuit 500 may be employed as RF circuit 211 of FIG. 2, RF circuit 411 of FIG. 4, RF circuit 711 of FIG. 7, and/or RF circuit 811 of FIG. 8. RF circuit 500 may transmit and/or receive RF signals to/from a slot antenna (e.g., slot antenna 407, 807), a patch antenna (e.g., patch antenna 714, 814, 914), a trace antenna (e.g., trace antenna 522, 622), a branch antenna (e.g., branch antenna 1524, 1624), and/or an enclosure antenna (e.g., enclosure antenna 1414, 1415, 1614, 1615). In some examples, slot antenna (e.g., slot antenna 407, 807) and/or enclosure antenna (e.g., enclosure antenna 1415, 1615) may be connected to GPS/WiFi/BT feed 560. GPS/WiFi/BT feed 560 may include a press-fit connector to connect the slot and/or enclosure antenna to antenna matching network 550. Antenna matching network 550 may include an impedance transformer comprising inductive and/or capacitive components that are configured to match the impedance of the slot antenna and/or enclosure antenna (e.g., 50 ohms) to the impedance of an RF source (e.g., diplexer 552) driving the slot antenna and/or enclosure antenna. Matching the impedance of the RF source to the impedance of the slot antenna and/or enclosure antenna may improve wireless performance by increasing RF power transfer to the slot antenna and/or enclosure antenna.

In some examples, antenna matching network 550 may be connected to a diplexer 552. Diplexer 552 may be connected to GPS RF engine 554 (e.g., an RF transceiver) and WiFi/BT RF engine 556 (e.g., an RF transceiver). Diplexer 552 may allow GPS RF engine 554 and WiFi/BT RF engine 556 to share a common communications channel with a slot antenna (e.g., slot antenna 407, 807) and/or an enclosure antenna (e.g., enclosure antenna 1415, 1615). Diplexer 552 may include passive devices that implement frequency-domain multiplexing. In some examples, GPS RF engine 554 may operate on a first frequency (e.g., a center frequency of 1575 MHz) while WiFi/BT RF engine 556 may operate on a second frequency (e.g., a center frequency in the range of 2400 MHz to 2500 MHz). Diplexer 552 may be configured to multiplex the RF signals from GPS RF engine 554 and WiFi/BT RF engine 556 to a common channel through antenna matching network 550.

In some examples, the slot antenna and/or enclosure antenna may receive RF signals (e.g., GPS signals) from a satellite. The RF signals from the satellite may pass through GPS/WiFi/BT feed 560, antenna matching network 550, and diplexer 552 to be processed by GPS RF engine 554. GPS RF engine 554 may process the RF signals (e.g., the GPS signals) from multiple satellites and triangulate the RF signals to determine a location of the watch body. GPS RF engine 554 may provide the location information to MCU 558 for use in location based applications.

In some examples, the slot antenna and/or enclosure antenna may transmit to and/or receive RF signals from an electronic device (e.g., a smartphone, a head-mounted display, an access point, etc.). The RF signals may conform to the WiFi and/or BT standards. The RF signals may pass through GPS/WiFi/BT feed 560, antenna matching network 550, and diplexer 552 to be processed by WiFi/BT RF engine 556. WiFi/BT RF engine 556 may process the RF signals to send and/or receive data. WiFi/BT RF engine 556 may send the data to MCU 558 and/or receive the data from MCU 558 for use in data applications associated with the watch body (e.g., social media applications, artificial-reality applications, web browsing, media streaming, voice calls, etc.).

In some examples, a trace antenna (e.g., trace antenna 822, 922), a branch antenna (e.g., branch antenna 1524, 1624) and/or an enclosure antenna (e.g., enclosure antenna 1414, 1415) may be connected to LTE trace feed 564. LTE trace feed 564 may include a press-fit connector to connect the trace antenna to LTE antenna matching network 562. LTE antenna matching network 562 may include an impedance transformer comprising inductive and/or capacitive components that match the impedance of the trace antenna (e.g., 50 ohms) to the impedance of an RF source (e.g., LTE RF engine 561) driving the trace antenna. Matching the impedance of the RF source to the impedance of the trace antenna may improve the performance of the trace antenna by increasing RF power transferred to the trace antenna.

In some examples, a trace antenna (e.g., trace antenna 822, 922), a branch antenna (e.g., branch antenna 1524, 1624) and/or an enclosure antenna (e.g., enclosure antenna 1414, 1415) may transmit to and/or receive RF signals from an electronic device (e.g., a cellular base station, a smartphone, a head-mounted display, an access point, etc.). The RF signals may conform to the LTE standards in a frequency range of about 698 MHz to about 2200 MHz, such as about 698 MHz to about 960 MHz and about 1710 MHz to about 2200 MHz. The RF signals may pass through LTE trace feed 564 and LTE antenna matching network 562 to be processed by LTE RF engine 561 (e.g., an RF transceiver). LTE RF engine 561 may process the RF signals to send and/or receive data (e.g., send and/or receive data from the Internet). LTE RF engine 561 may send the data to MCU 558 and/or receive the data from MCU 558 for use in data applications associated with the watch body (e.g., social media applications, artificial-reality applications, web browsing, media streaming, voice calls, etc.).

In some examples, a slot antenna (e.g., slot antenna 707, 1107), a patch antenna (e.g., patch antenna 714, 814, 914), a trace antenna (e.g., trace antenna 822, 922), a branch antenna (e.g., branch antenna 1524, 1624), and/or an enclosure antenna (e.g., enclosure antenna 1414, 1415, 1614, 1615) may be connected to tuner feed 566. Tuner feed 566 may include a press-fit connector to connect the patch antenna to tuner switch 568. MCU 558 may receive proximity status from proximity sensor 506 and control tuner switch 568 based on the status of proximity sensor 506. Tuner switch 568 may switch inductive elements, capacitive elements, resistive elements, or any combination thereof in series and/or in parallel with the slot antenna (e.g., slot antenna 707, 1107), patch antenna (e.g., patch antenna 714, 814, 914), trace antenna (e.g., trace antenna 822, 922), branch antenna (e.g., branch antenna 1524, 1624), and/or enclosure antenna (e.g., enclosure antenna 1414, 1415, 1614, 1615). For example, tuner switch 568 may switch inductor 570 in series and/or in parallel with the slot antenna (e.g., slot antenna 707, 1107), patch antenna (e.g., patch antenna 714, 814, 914), trace antenna (e.g., trace antenna 822, 922), branch antenna (e.g., branch antenna 1524, 1624), and/or enclosure antenna (e.g., enclosure antenna 1414, 1415, 1614, 1615).

In some examples, tuner switch 568 may function as an aperture tuner and adjust a center frequency of the patch antenna (e.g., patch antenna 714, 814, 914), by switching the impedance tuning element (e.g., inductor 570, resistor 574, open circuit 576, capacitor 578, or short circuit 579) between the ground plane and the patch antenna (e.g., patch antenna 714, 814, 914).

Tuner switch 568 may switch resistor 574 (e.g., a zero ohm resistor) in series and/or in parallel with the slot antenna (e.g., slot antenna 707, 1107), patch antenna (e.g., patch antenna 714, 814, 914), trace antenna (e.g., trace antenna 822, 922), branch antenna (e.g., branch antenna 1524, 1624), and/or enclosure antenna (e.g., enclosure antenna 1414, 1415, 1614, 1615). Tuner switch 568 may switch open circuit 576 in series and/or in parallel with the slot antenna (e.g., slot antenna 707, 1107), patch antenna (e.g., patch antenna 714, 814, 914), trace antenna (e.g., trace antenna 822, 922), branch antenna (e.g., branch antenna 1524, 1624), and/or enclosure antenna (e.g., enclosure antenna 1414, 1415, 1614, 1615). Tuner switch 568 may switch capacitor 578 in series and/or in parallel with the slot antenna (e.g., slot antenna 707, 1107), patch antenna (e.g., patch antenna 414, 514, 614, 714), trace antenna (e.g., trace antenna 822, 922), branch antenna (e.g., branch antenna 1524, 1624), and/or enclosure antenna (e.g., enclosure antenna 1414, 1415, 1614, 1615).

In some examples, tuner switch 568 may convert an antenna of the watch body from one type of antenna to a different type of antenna. For example, an enclosure antenna (e.g., enclosure antenna 1414, 1415, 1614, 1615) may be converted from a monopole antenna to a loop antenna by switching tuner switch 568 to ground (e.g., a PCB ground plane) through short circuit 579. Shorting tuner switch 568 to ground may change an effective radiation geometry of the enclosure antenna and convert it from a monopole antenna to a loop antenna. Tuner switch 568 may convert the enclosure antenna from a loop antenna to a monopole antenna by removing the short to ground by opening short circuit 579.

Although FIG. 5 shows tuner switch 568 includes a single pole switch selecting one of 4 tuning elements (e.g., inductor 570, resistor 574, open circuit 576, and capacitor 578), the present disclosure is not so limited. Tuner switch 568 may switch any value of capacitor 578, inductor 570, or resistor 574 in series and/or in parallel with each antenna of the watch body. For example, capacitor 578 may include a fixed value of capacitance or a programmable value of capacitance. Inductor 570 may include a fixed value of inductance or a programmable value of inductance. Resistor 574 may include a fixed value of resistance, a short circuit (e.g., zero ohms), or a programmable value of resistance. LTE RF engine 561 may determine the programmed value of capacitance, inductance, or resistance. The programmed value of capacitance, inductance, or resistance may be selected from a discrete set of values or the values may be variable (e.g., continuously variable within a programmable range). Further, the selection of capacitance, inductance, or resistance may not be mutually exclusive, and any inclusive combination of capacitance, inductance, or resistance may be switched in series and/or in parallel with each antenna of the watch body.

In some examples, tuner switch 568 may include a feedback loop to further improve wireless performance. Tuner switch 568 may compute an initial setting for capacitive, inductive, or resistive elements to be placed in series and/or in parallel with each antenna of the watch body. After the initial setting of the elements (e.g., the tuning parameters), the efficiency of the antenna may be measured and sent back via a feedback loop to LTE RF engine 561 to determine whether additional tuning is required (e.g., an adjustment of the settings for capacitive, inductive, or resistive elements).

In some examples, tuner switch 568 may switch inductive elements, capacitive elements, resistive elements, or any combination thereof in series and/or parallel to each antenna of the watch body in order to adjust a center frequency of the patch antenna based on the state of a proximity sensor (e.g., sensor 114, proximity sensor 506). A sensor substrate (e.g., sensor substrate 816, 916) may include the proximity sensor (e.g., sensor 114, proximity sensor 506) configured to determine the proximity of the watch body to a user. The user's body (e.g., the user's lower arm) may change the impedance matching, the radiated power, and/or the radiation pattern of the antennas of the watch body, which may degrade the performance of the wireless communications in the watch body. For example, an antenna in a mobile device (e.g., a smartwatch) may suffer a 6 dB impedance mismatching loss when the user's finger touches certain portions of the smartwatch (e.g., as shown in FIG. 3), which may result in a significant reduction in antenna performance. Tuner switch 568 may mitigate the effects of the human body on antenna performance by adjusting the center frequency of the antenna based on proximity to the user.

Figure 6A:
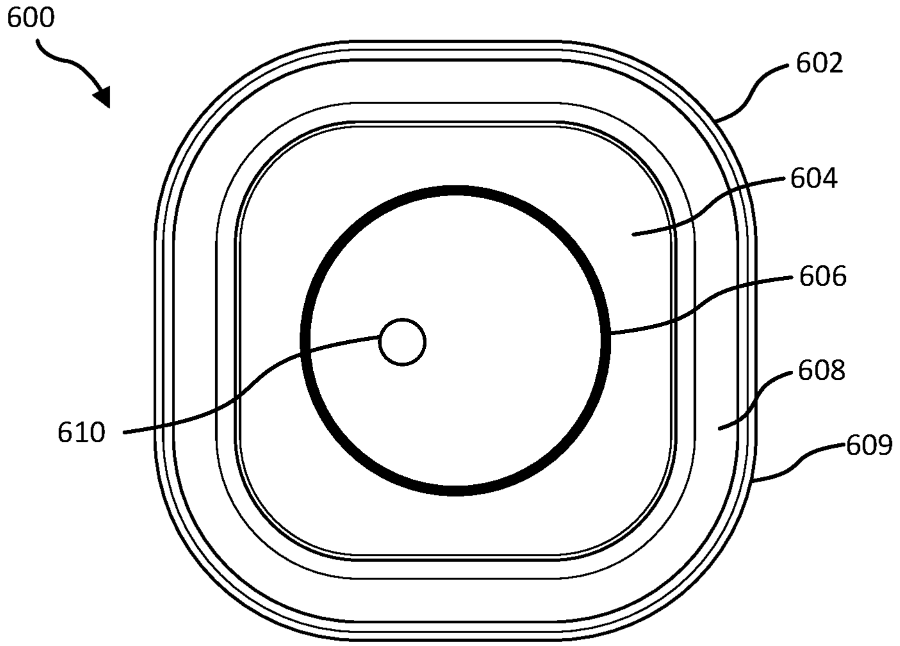
FIG. 6A is a bottom plan view of an example watch assembly, according to at least one embodiment of the present disclosure.
Figure 6B:
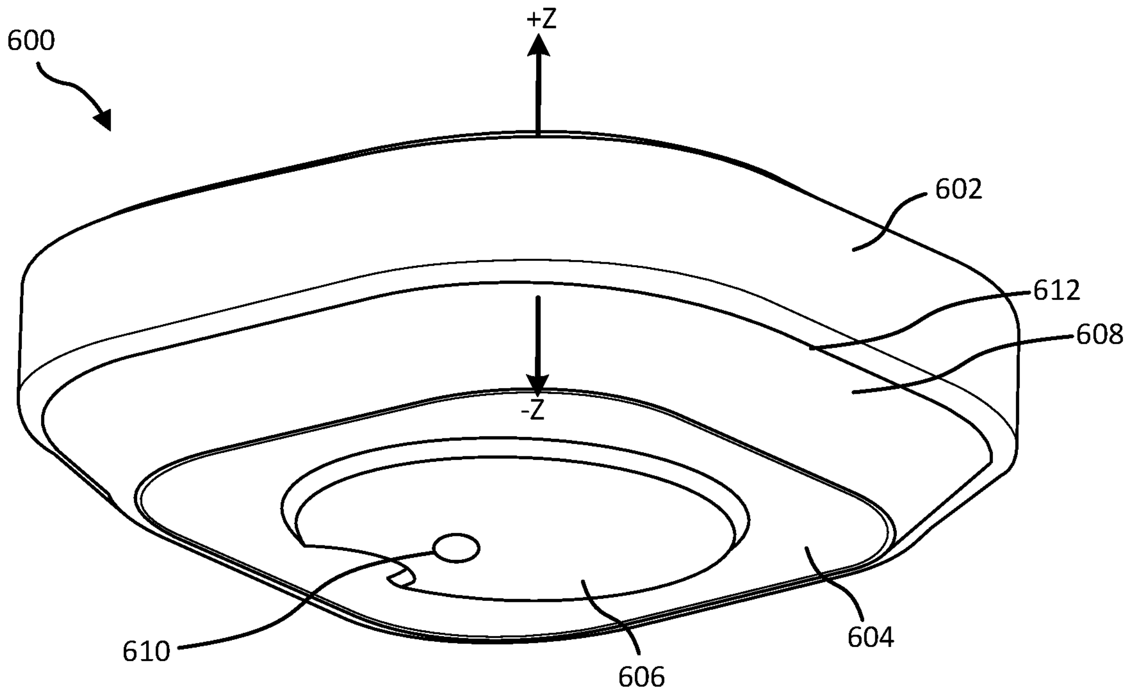
FIG. 6B is a perspective view of the example watch assembly of FIG. 6A, according to at least one embodiment of the present disclosure.

FIG. 6A is a bottom plan view and FIG. 6B is a perspective view of an example watch assembly 600 including a watch body 609 and a cradle 608, according to at least one embodiment of the present disclosure. Watch body 609 may include an enclosure 602 (e.g., an electrically conductive enclosure) that extends around a perimeter of watch body 609. Enclosure 602 may include enclosure antennas as described in more detail with reference to FIG. 14. Watch assembly 600 may include a cradle 608 (e.g., an electrically non-conductive or conductive cradle) that is configured as a coupling mechanism for detachably coupling watch body 609 to a watch band (e.g., watch band 112 of FIG. 1). Watch assembly 600 may include a non-conductive base 604 (e.g., an underside of a lower housing of watch body 609) including a structure between cradle 608 and a sensor dome 606. Sensor dome 606 may include a proximity sensor 610 (e.g., a heart rate sensor) that determines a proximity of watch assembly 600 to a user's skin.

As will be further explained below with reference to FIG. 7, in some examples, watch body 609 may include a ground plane (e.g., a conductive layer such as ground plane 708 of FIG. 7) within an interior portion of watch body 609 and a slot antenna that includes a radiating slot defined by a gap between the ground plane and enclosure 602. The slot antenna may radiate radio waves substantially along a +Z axis and −Z axis. In some examples, watch assembly 600 may include a cradle gap 612 between enclosure 602 and cradle 608. Cradle gap 612 may include a non-conductive material. Additionally or alternatively, the slot antenna may radiate radio waves through cradle gap 612 that may be present between enclosure 602 and cradle 608. Cradle gap 612 may include a gap greater than or equal to about 0.5 mm, about 0.75 mm, about 1 mm, about 1.25 mm, or about 1.5 mm.

As will be further explained below with reference to FIGS. 8 and 9, in some examples, watch body 609 may include a patch antenna within an interior portion (e.g., the lower housing) of watch body 609 that substantially surrounds a sensor substrate disposed proximate to sensor dome 606. Without limitation, the patch antenna may radiate radio waves through non-conductive base 604 (e.g., the underside of the lower housing of watch body 609). In some examples, watch body 609 may include an antenna tuning circuit that tunes the slot antenna and/or the patch antenna depending on whether watch body 609 is worn by the user.

Figure 7:
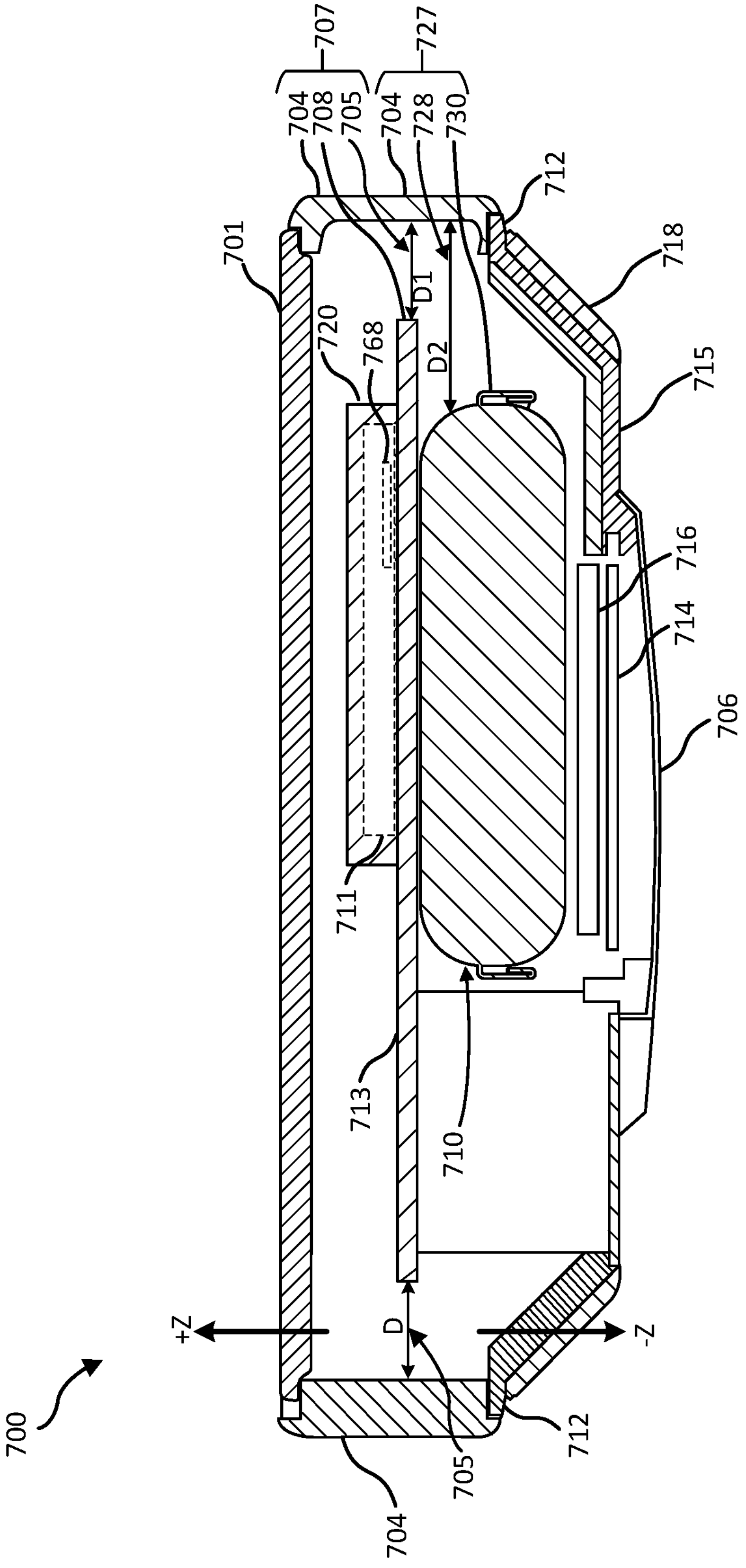
FIG. 7 is a cross-sectional side view of components of an example watch assembly, according to at least one embodiment of the present disclosure.

FIG. 7 is a cross-sectional side view of components of an example watch body 700, according to at least one embodiment of the present disclosure. Watch body 700 may include a slot antenna 707 that includes a radiating slot 705, an enclosure 704, and a ground plane 708 of a printed circuit board 713. Radiating slot 705 may have a width D1 defined by a gap between a conductive portion of enclosure 704 and ground plane 708. In some examples, gap width D1 may include a free space air gap. Gap width D may be based on the wavelength of the RF energy to be radiated by slot antenna 707. For example, gap width D1 may be greater than or equal to about 0.5 mm, about 0.75 mm, about 1 mm, about 1.25 mm, or about 1.5 mm. The free space air gap of radiating slot 705 may extend along a perimeter (e.g., an inner perimeter) of enclosure 704. As shown in FIG. 7, slot antenna 707 may radiate (e.g., transmit and/or receive) radio waves in radiating slot 705 substantially along the Z axis in the +Z direction through display glass 701 and/or in the −Z direction through a non-conductive base 715.

In some examples, watch body 700 may include multiple slot antennas. For example, watch body 700 may include slot antenna 707 and further include at least one additional slot antenna 727 that includes a radiating slot 728, enclosure 704, and a conductive battery casing 730. Conductive battery casing 730 may be electrically connected to ground plane 708. Radiating slot 728 may have a width D2 defined by a gap between a conductive portion of enclosure 704 and conductive battery casing 730. In some examples, gap width D2 may include a free space air gap. Gap width D2 may be based on the wavelength of the RF energy to be radiated by slot antenna 727. For example, gap width D2 may be greater than or equal to about 0.5 mm, about 0.75 mm, about 1 mm, about 1.25 mm, about 1.5 mm, about 2.0 mm, or more. The free space air gap of slot antenna 727 may extend along a perimeter (e.g., an inner perimeter) of enclosure 704. As shown in FIG. 7, slot antenna 727 may radiate (e.g., transmit and/or receive) radio waves in slot 728 substantially along the Z axis in the +Z direction through display glass 701 and/or in the −Z direction through a non-conductive base 715.

In some examples, slot antenna 707 may radiate (e.g., transmit and/or receive) radio waves in an omnidirectional pattern, an isotropic pattern, a lobe pattern, or a combination thereof. Additionally or alternatively, slot antenna 707 may radiate radio waves through a non-conductive cradle gap 712. Cradle gap 712 may include a non-conductive material positioned between enclosure 704 and cradle 718. In some examples, cradle gap 712 may include a gap greater than or equal to about 0.2 mm, about 0.3 mm, about 0.4 mm, about 0.5 mm, or about 0.6 mm.

Enclosure 704 may include any conductive material including, without limitation, one or more metals (e.g., copper, steel, aluminum, stainless steel, gold, etc.), alloys, graphite, doped materials, etc. Ground plane 708 may include any planar conductive material. For example, ground plane 708 may include a copper layer within printed circuit board 713. Ground plane 708 may include a low impedance path to an electrical ground (e.g., analog ground and/or digital ground) of watch body 700.

Battery 710 may provide power for the electrical components in watch body 700. In some examples, battery 710 may include an outer conductive layer (e.g., a metallic foil covering) that may provide a low impedance path to ground plane 708. Sensor substrate 716 may be electrically connected to the outer conductive layer of battery 710. The outer conductive layer of battery 710 may act as a low impedance ground path that creates substantially the same ground reference potential for ground plane 708 and sensor substrate 716. Watch body 700 may include one or more ground points. Current flowing through the finite resistance of the ground point(s) may create a ground loop that causes interference and noise in the components of watch body 700. The outer conductive layer of battery 710 may act as a low-impedance ground path that reduces interference and noise that may be caused by ground loops.

In some examples, a shield 720 may include a conductive material substantially covering an RF circuit 711 and electrically connected to ground plane 708. Shield 720 may electrically isolate RF circuit 711 and reduce electrical interference generated by RF circuit 711 from affecting surrounding circuits and/or reduce electrical interference generated by surrounding circuits from affecting RF circuit 711. As will be described in more detail with reference to FIGS. 8-10, RF signals between RF circuit 711 and slot antenna 707 and/or patch antenna 714 may travel through antenna feeds.

In some examples, watch body 700 may include a patch antenna 714. Patch antenna 714 may include a substantially planar conductor (e.g., a metal layer). Patch antenna 714 may be disposed substantially parallel to ground plane 708 and adjacent to sensor dome 706. Patch antenna 714 may radiate radio waves through at least sensor dome 706. A sensor substrate 716 may also be disposed within watch body 700. Sensor substrate 716 may include a printed circuit board populated with sensing and/or conditioning circuits and sensors. For example, sensor substrate 716 may include the sensors described above with reference to FIG. 1. Sensor substrate 716 may be positioned adjacent to sensor dome 706. Sensor dome 706 may be positioned to contact a user's skin when worn by the user such that proximity sensors (e.g., sensor 114 of FIG. 1) on sensor substrate 716 may sense whether the user is wearing watch body 700. RF circuit 711 may read the status of the proximity sensor to determine whether the user is wearing watch body 700 and tune patch antenna 714 and/or slot antenna 707 to improve wireless communications performance (e.g., antenna performance) of watch body 700 based on whether the user is wearing watch body 700. For example, RF circuit 711 may adjust a center frequency of patch antenna 714 and/or slot antenna 707 based on the state of the proximity sensor.

Figure 8:
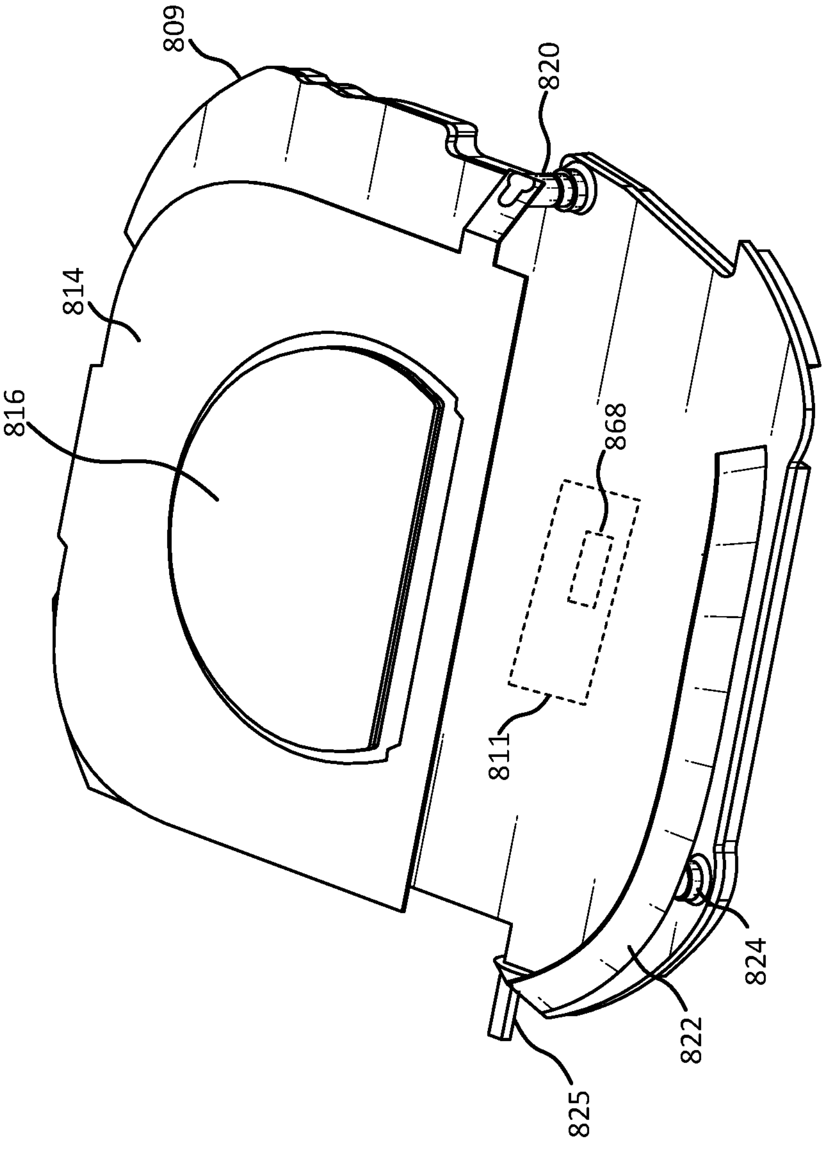
FIG. 8 is a perspective view of antenna elements of an example watch body, according to at least one embodiment of the present disclosure.

FIG. 8 is a perspective bottom view of antenna elements of an example watch body, according to at least one embodiment of the present disclosure. The antenna elements may include patch antenna 814. Patch antenna 814 may include a substantially planar conductor (e.g., a metal layer) connected to an RF circuit 811 through patch feed 820. Patch feed 820 may include a connector suitable for passing RF signals from patch antenna 814 to RF circuit 811 and/or from RF circuit 811 to patch antenna 814. Patch feed 820 may include a press-fit connector (e.g., a surface-mount connector) to connect patch antenna 814 to RF circuit 811 on printed circuit board 809. Patch feed 820 may also be connected to a tuner switch 868 of RF circuit 811. Tuner switch 868 may be configured to switch inductive elements, capacitive elements, resistive elements, or combinations thereof in series and/or parallel to patch antenna 814 in order to adjust a center frequency of patch antenna 814 based on the state of a proximity sensor (e.g., sensor 114 of FIG. 1) that determines whether a user is wearing the watch body.

In some examples, patch antenna 814 may be configured as a monopole antenna to radiate with at least one frequency in a frequency band of about 698 MHz to about 960 MHz (e.g., LTE low band). For example, RF circuit 811 may transmit and/or receive RF waveforms complying with the LTE standard. The LTE waveforms may pass through patch feed 820 to patch antenna 814. Patch antenna 814 may radiate the LTE waveforms through a non-conductive portion of an enclosure (e.g., a lower housing) that houses patch antenna 814.

In some examples, patch antenna 814 may substantially surround a periphery of sensor substrate 816. Patch antenna 814 may also be oriented in about a same plane as sensor substrate 816. As will be described in detail below with reference to FIG. 10, sensor substrate 816 may be connected to printed circuit board 809 through a flexible cable (not shown in FIG. 8). Sensor substrate 816 may be electrically isolated from patch antenna 814 based on isolating gap(s) around sensor substrate 816 and/or isolating gap(s) around the flexible cable connecting sensor substrate 816 to printed circuit board 809. Electrically isolating patch antenna 814 from sensor substrate 816 may reduce mutual interference between patch antenna 814 and sensor substrate 816, which may improve the performance of patch antenna 814 and/or sensor substrate 816.

The antenna elements may include trace antenna 822. Trace antenna 822 may include a conductive material (e.g., a metal layer, a metal layer adhered to a structural non-conductive substrate, etc.) positioned along a portion of the lower housing of the watch body. Trace antenna 822 may be connected to RF circuit 811 through trace feed 824. Trace feed 824 may include a connector suitable for passing RF signals from trace antenna 822 to RF circuit 811 and/or from RF circuit 811 to trace antenna 822. Trace feed 824 may include a press-fit connector (e.g., a surface-mount connector) to connect trace antenna 822 to RF circuit 811 on printed circuit board 809. Trace feed 824 may also be connected to tuner switch 868 of RF circuit 811. Tuner switch 868 may switch inductive elements, capacitive elements, resistive elements, or any combination thereof in series and/or parallel to trace antenna 822 in order to adjust a center frequency of trace antenna 822 based on the state of a proximity sensor (e.g., sensor 114 of FIG. 1).

Referring to FIGS. 7 and 8, in some examples, trace antenna 822 may be configured to improve the isolation between LTE middle band performance in slot antenna 707 and GPS/WiFi/BT performance in slot antenna 707. For example, in addition to GPS/WiFi/BT galvanic coupling to enclosure 704 through enclosure feed 825, trace antenna 822 may generate an electric field to capacitively couple trace antenna 822 to enclosure 704 in order to further excite the resonance mode of slot antenna 707 for LTE middle band resonances. Trace antenna 822 may have a galvanic connection (e.g., via trace feed 824) to printed circuit board 809 to connect to RF circuit 811. RF circuit 811 may be connected to patch antenna 814 through patch feed 820 in order to excite LTE low band resonances (e.g., about 698 MHz to about 960 MHz).

In some examples, slot antenna 707 may transmit and/or receive radio waves complying with wireless communication standards including, without limitation, LTE, 3G, 4G, 5G, 6G, WiFi, Global Navigation Satellite System (GNSS), Global Positioning System (GPS) and BT. For example, slot antenna 707 may transmit and/or receive radio waves in a 1500 MHz to 2500 MHz frequency band. Enclosure 704 of slot antenna 707 may be connected to an RF circuit (e.g., RF circuit 711 of FIG. 7, RF circuit 811 of FIG. 8) through enclosure feed 825. Enclosure feed 825 may include a connector suitable for passing RF signals from enclosure 704 of slot antenna 707 to RF circuit 711, 811 and/or from RF circuit 711, 811 to enclosure 704. Enclosure feed 825 may include a press-fit connector (e.g., a surface-mount connector) to connect enclosure 704 to RF circuit 711, 811 on printed circuit board 809. Enclosure feed 825 may also be connected to tuner switch 768 of FIG. 7 and/or tuner switch 868 of FIG. 8. Tuner switch 768 of FIG. 7 and/or tuner switch 868 of FIG. 8 may switch inductive elements, capacitive elements, resistive elements, or any combination thereof in series and/or parallel to enclosure 704 of slot antenna 707 in order to adjust a center frequency of slot antenna 707 based on the state of a proximity sensor (e.g., sensor 114 of FIG. 1).

Figure 9:
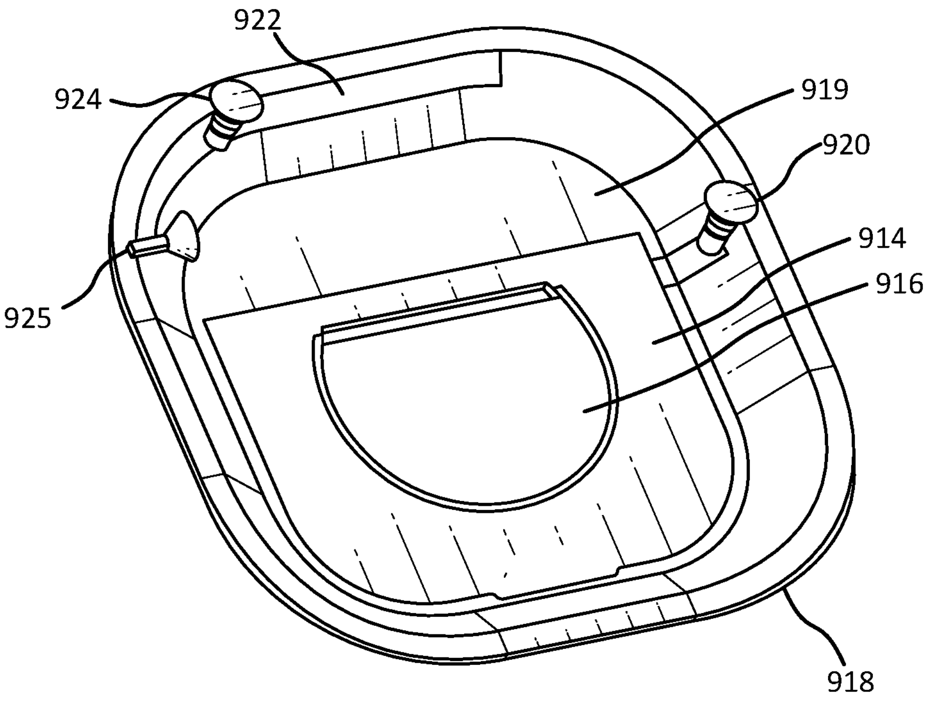
FIG. 9 is a perspective view of antenna elements within a lower housing of an example watch body, according to at least one embodiment of the present disclosure.

FIG. 9 is a perspective view of antenna elements within a lower housing 918 of an example watch body, according to at least one embodiment of the present disclosure. The antenna elements may include patch antenna 914. Patch antenna 914 may include a substantially planar conductor (e.g., a metal layer) connected to an RF circuit (e.g., RF circuit 811 of FIG. 8) through patch feed 920. Patch antenna 914 may radiate radio waves through a non-conductive base 919 of lower housing 918. Patch feed 920 may include a connector suitable for passing RF signals from patch antenna 914 to RF circuit 811 and/or from RF circuit 811 to patch antenna 914. Patch feed 920 may also be connected to a tuner switch of RF circuit 811. The tuner switch may switch inductive elements, capacitive elements, resistive elements, or any combination thereof in series and/or parallel to patch antenna 914 in order to adjust a center frequency of patch antenna 914 based on the state of a proximity sensor (e.g., sensor 114 of FIG. 1). A sensor substrate 916 may include the proximity sensor that may be configured to determine the proximity of the watch body to a user. As shown in FIG. 9, sensor substrate 916 may be positioned within lower housing 918 such that patch antenna 914 surrounds a periphery of sensor substrate 916 and is substantially in the same plane as sensor substrate 916.

In some examples, patch antenna 914 may be configured as a monopole antenna to radiate with at least one frequency in a frequency band of about 698 MHz to about 960 MHz. For example, RF circuit 811 may transmit and/or receive RF waveforms compliant with the LTE standard. The LTE waveforms may pass through patch feed 920 to patch antenna 914. Patch antenna 914 may radiate the LTE waveforms through non-conductive base 919 of lower housing 918.

As will be described in detail with reference to FIG. 10, sensor substrate 916 may be connected to a printed circuit board (e.g., printed circuit board 809 of FIG. 8) through a flexible cable (not shown in FIG. 9). Sensor substrate 916 may be electrically isolated from patch antenna 914 based on isolating gap(s) around sensor substrate 916 and/or isolating gap(s) around the flexible cable connecting sensor substrate 916 to printed circuit board 809.

As shown in FIG. 9, the antenna elements may include trace antenna 922. Trace antenna 922 may include a conductive material (e.g., a metal layer adhered to a structural non-conductive substrate) positioned along a portion of the inner perimeter of lower housing 918. Trace antenna 922 may be connected to an RF circuit (e.g., RF circuit 811 of FIG. 8) through trace feed 924. Trace feed 924 may include a connector suitable for passing RF signals from trace antenna 922 to RF circuit 811 and/or from RF circuit 811 to trace antenna 922. Trace feed 924 may also be connected to a tuner switch of RF circuit 811. The tuner switch may switch inductive elements, capacitive elements, resistive elements, or any combination thereof in series and/or parallel to trace antenna 922 in order to adjust a center frequency of trace antenna 922 based on the state of a proximity sensor (e.g., sensor 114 of FIG. 1).

As described above, slot antenna 707 may transmit and/or receive radio waves in a 1500 MHz to 2500 MHz frequency band compliant with LTE, WiFi, GPS, and BT. Enclosure 704 of slot antenna 707 (not shown in FIG. 9) may be connected to RF circuit 811 through enclosure feed 925. Enclosure feed 925 is shown in FIG. 9 positioned to connect the printed circuit board (e.g., printed circuit board 809) to enclosure 704. Enclosure feed 925 may include a press-fit connector (e.g., a surface-mount connector) to connect enclosure 704 to RF circuit 811 on printed circuit board 809.

Figure 10:
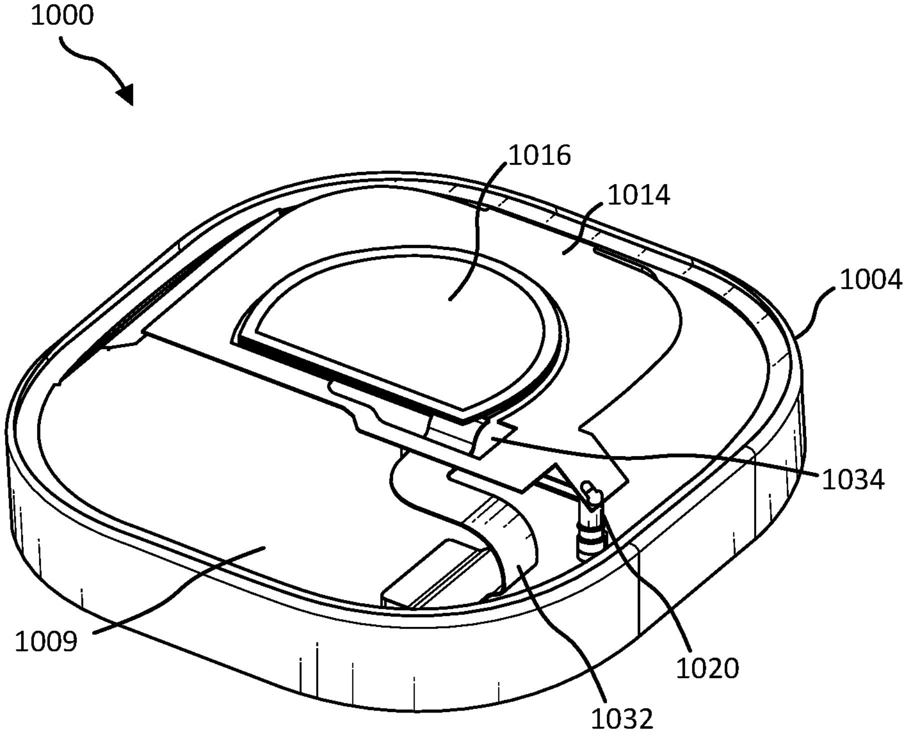
FIG. 10 is a perspective view of a sensor substrate and interconnecting elements of an example watch body, according to at least one embodiment of the present disclosure.

FIG. 10 is a perspective view of sensor substrate 1016 and interconnecting elements of a watch body 1000, according to at least one embodiment of the present disclosure. As shown in FIG. 10, printed circuit board 1009 may be connected to sensor substrate 1016 through flexible cable 1032. In some examples, enclosure 1004 may include patch antenna 1014 that substantially surrounds a periphery of sensor substrate 1016. Patch antenna 1014 may also be oriented in about the same plane as sensor substrate 1016. Sensor signals may pass through flexible cable 1032 from sensor substrate 1016 to printed circuit board 1009. RF signals may pass through patch feed 1020 from printed circuit board 1009 to patch antenna 1014. Due to the close proximity of patch antenna 1014 to sensor substrate 1016 and flexible cable 1032, mutual interference between the signals in patch antenna 1014, sensor substrate 1016, and flexible cable 1032 may be mitigated by creating an isolating gap between patch antenna 1014, sensor substrate 1016, and flexible cable 1032. As shown in FIG. 10, isolating gap 1034 may include a free space air gap surrounding flexible cable 1032 in the region where flexible cable 1032 passes through patch antenna 1014 from printed circuit board 1009 to sensor substrate 1016. The dimensions of isolating gap 1034 may be based on the amplitude and/or frequency of the electric fields generated by the signals associated with patch antenna 1014 and/or sensor substrate 1016.

Figure 11:
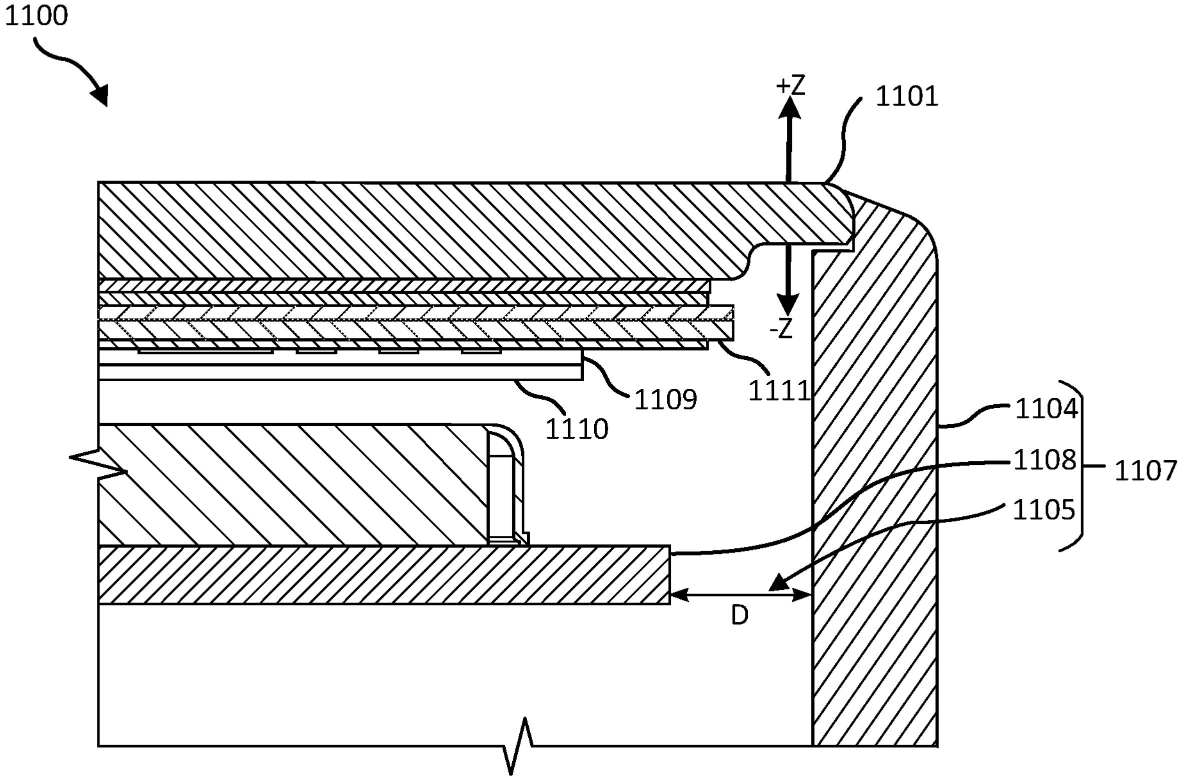
FIG. 11 is a partial cross-sectional view of a slot antenna and display shield of an example watch body, according to at least one embodiment of the present disclosure.

FIG. 11 is a partial cross-sectional view of a slot antenna 1107 and a display shield 1110 of an example watch body 1100, according to at least one embodiment of the present disclosure. Slot antenna 1107 may include a radiating slot 1105 having a width D that may be defined by a gap between a conductive portion of enclosure 1104 and a ground plane 1108. In some examples, gap width D may include a free space air gap greater than or equal to about 0.5 mm, about 0.75 mm, about 1 mm, about 1.25 mm, or about 1.5 mm. The free space air gap may extend along a perimeter (e.g., an inner perimeter) of enclosure 1104. Slot antenna 1107 may be configured to radiate (e.g., transmit and/or receive) radio waves in slot 1105 substantially along the +Z axis through display 1111 that is positioned under transparent panel 1101. Display 1111 may include a thin conductive layer of indium tin oxide (ITO) and/or another conductive material. ITO may be absorptive to the radiation produced by slot antenna 1107, thereby reducing the efficiency and performance of slot antenna 1107. To reduce the negative effects of the ITO on slot antenna 1107 performance, display shield 1110 may be positioned between slot antenna 1107 and display 1111. Display shield 1110 may include a conductive material (e.g., a metal sheet material) connected to ground and configured to reduce the radiation produced by slot antenna 1107 from being absorbed by the ITO layer of display 1111.

In some examples, watch body 1100 may include a near-field communication (NFC) antenna 1109 positioned between display shield 1110 and display 1111. NFC antenna 1109 may radiate radio waves conformant to the NFC standard through and/or around display 1111 and through transparent panel 1101. NFC antenna 1109 may include a coil-shaped metal layer that emits radiation and a ferrite layer. The ferrite layer may be positioned between the coil shaped metal layer and display shield 1110. The ferrite layer may prevent radiation from NFC antenna 1109 from traveling in the −Z direction and channel the radiation in the +Z direction through and/or around display 1111 and through transparent panel 1101.

Figure 12A:
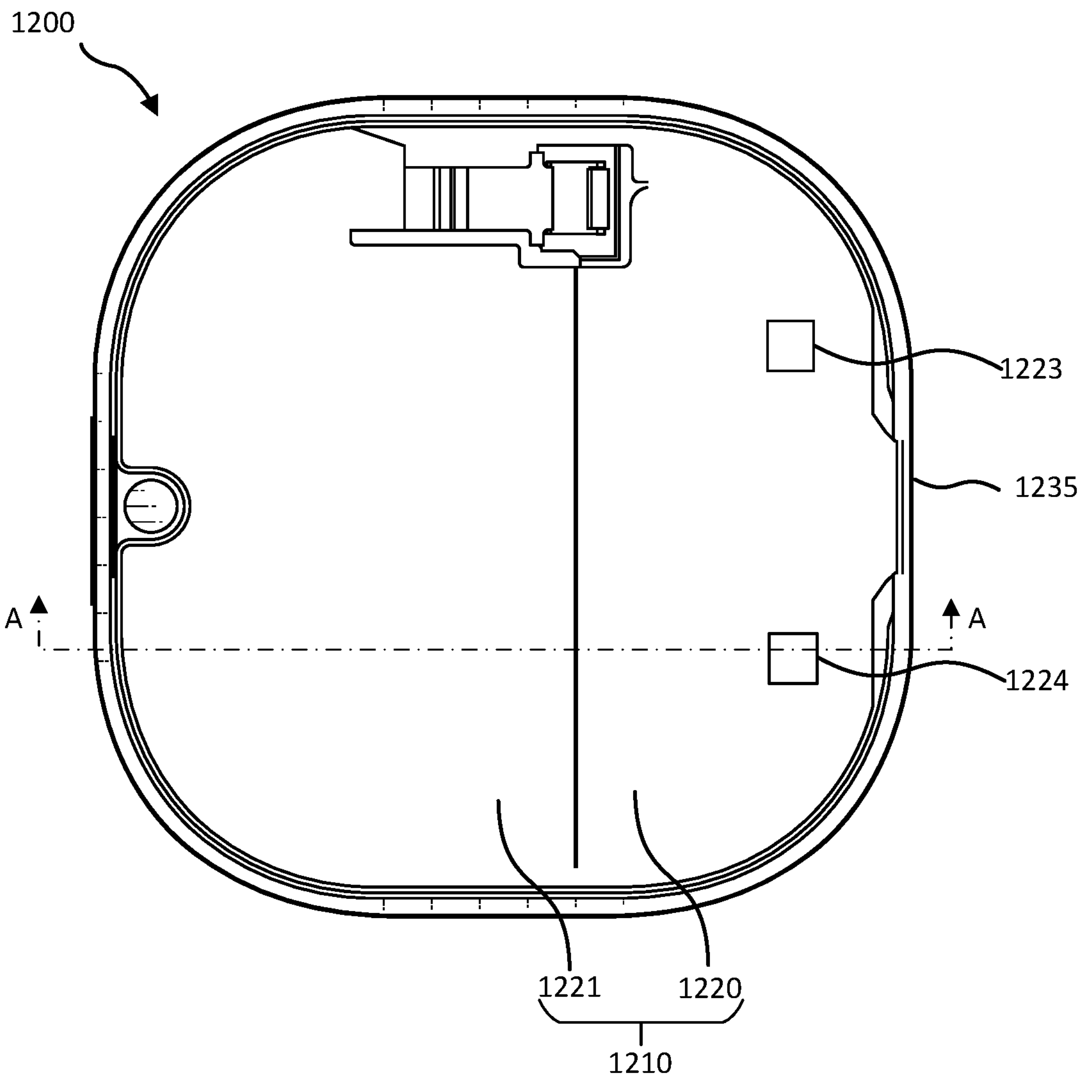
FIG. 12A is a plan view of a display shield with one or more grounding locations of an example watch body, according to at least one embodiment of the present disclosure.
Figure 12B:
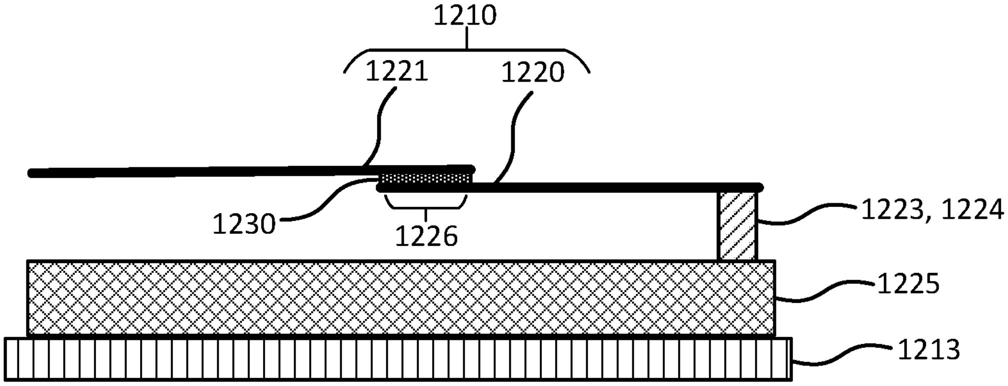
FIG. 12B is a cross-sectional view of a display shield with one or more grounding locations of an example watch body taken at line A-A in FIG. 12A, according to at least one embodiment of the present disclosure.

FIG. 12A is a plan view of a display shield 1210 with one or more grounding locations (e.g., one or more grounding locations disposed along an end region of display shield 1210) disposed in a watch body 1200. FIG. 12B is a cross-sectional view of display shield 1210 with the one or more grounding locations, taken at line A-A of FIG. 12A. As described above with reference to FIG. 11, watch body 1200 may include a display shield 1210 positioned between a display (e.g., display 1111 of FIG. 11) of watch body 1200 and a printed circuit board (e.g., printed circuit board 1213 of FIG. 12B). Display shield 1210 may include multiple conductive layers configured to cover an area under the display. In some embodiments, display shield 1210 may include a flexible conductive portion 1220 and a metal sheet portion 1221 (e.g., a copper tape). Flexible conductive portion 1220 may overlap an area of metal sheet portion 1221 such that a continuous conductive shield is produced. As shown in FIG. 12B, the overlapping area between flexible conductive portion 1220 and metal sheet portion 1221 may be connected by a conductive adhesive (e.g., a double-sided conductive adhesive tape, solder, etc.) to form an electrical connection between flexible conductive portion 1220 and metal sheet portion 1221.

Although display shield 1210 is illustrated in FIG. 12B as including the overlapping flexible conductive portion 1220 and metal sheet portion 1221 coupled to each other, the present disclosure is not so limited. In additional embodiments, display shield 1210 may be formed of a unitary, integral conductive material or more than two conductive elements that are coupled to each other.

Display shield 1210 may include grounding points 1223, 1224. Grounding points 1223, 1224 may each provide an electrical connection (e.g., metal clips, spring clips, solder connections, etc.) between display shield 1210 and an electrical ground of watch body 1200 (e.g., ground plane 708 of FIG. 7). Grounding points 1223, 1224 may be located at one or more grounding locations (e.g., at one end region of display shield 1210 as shown in FIG. 12A). Although FIG. 12A shows two grounding points 1223, 1224, at one end region of display shield 1210, the present disclosure is not so limited, and any number of ground points may be included at the region. For example, FIGS. 13A and 13B, described below, illustrate an embodiment with additional grounding locations in different regions across display shield 1310.

In some examples, display shield 1210 may cover an area substantially equal to the area of the display. Display shield 1210 may cover an area within an inner perimeter of watch body 1200 and include a free space air gap located between display shield 1210 and a watch body enclosure 1235. The free space air gap between watch body enclosure 1235 and display shield 1210 may be about 0.5 mm, about 1.0 mm, or about 1.5 mm. The free space air gap between watch body enclosure 1235 and display shield 1210 may provide electrical isolation between watch body enclosure 1235 and display shield 1210.

FIG. 12B shows a cross-sectional side view of display shield 1210 connected to ground along one region (e.g., one side) of display shield 1210. Display shield 1210 may include flexible conductive portion 1220 and metal sheet portion 1221 (e.g., a copper tape). Flexible conductive portion 1220 may overlap an area 1226 of metal sheet portion 1221 such that a continuous conductive shield is produced. In some examples, overlapping area 1226 between flexible conductive portion 1220 and metal sheet portion 1221 may be connected by a conductive adhesive 1230 (e.g., a double-sided conductive adhesive tape, solder, etc.) to form an electrical connection between flexible conductive portion 1220 and metal sheet portion 1221.

Display shield 1210 may include grounding points 1223, 1224. Grounding points 1223, 1224 may each provide an electrical connection between display shield 1210 and an electrical ground of watch body 1200. Grounding points 1223, 1224 may be located at one region (e.g., one end) of display shield 1210 as shown in FIG. 12B. Although FIG. 12B shows two grounding points 1223, 1224, the present disclosure is not so limited, and any number of ground points may be located at one region (e.g., one end) of display shield 1210. Grounding points 1223, 1224 may be connected to a conductive shield 1225 that covers a portion of printed circuit board 1213. Conductive shield 1225 may be connected to a ground layer of printed circuit board 1213 to complete the connection between display shield 1210 and ground. Connecting display shield 1210 at one end of display shield 1210 may increase the length and/or area of the PCB ground.

In some examples, connecting one end of display shield 1210 to ground may allow display shield 1210 to function as a ground radiator and resonate in an LTE low band frequency range (e.g., about 698 MHz to about 960 MHz) thereby improving the wireless performance of watch body 1200. In some examples, display shield 1210 may improve the LTE link margin budget by about 0.5 dB, by about 1.0 dB, by about 1.5 dB, or more. In some examples, display shield 1210 may be configured to have a length that matches a ¼ wavelength of the LTE low band frequency range. Display shield 1210 may be configured to have a length of about 30 mm, about 40 mm, about 50 mm, about 60 mm, about 70 mm, about 80 mm, or more.

Figure 13A:
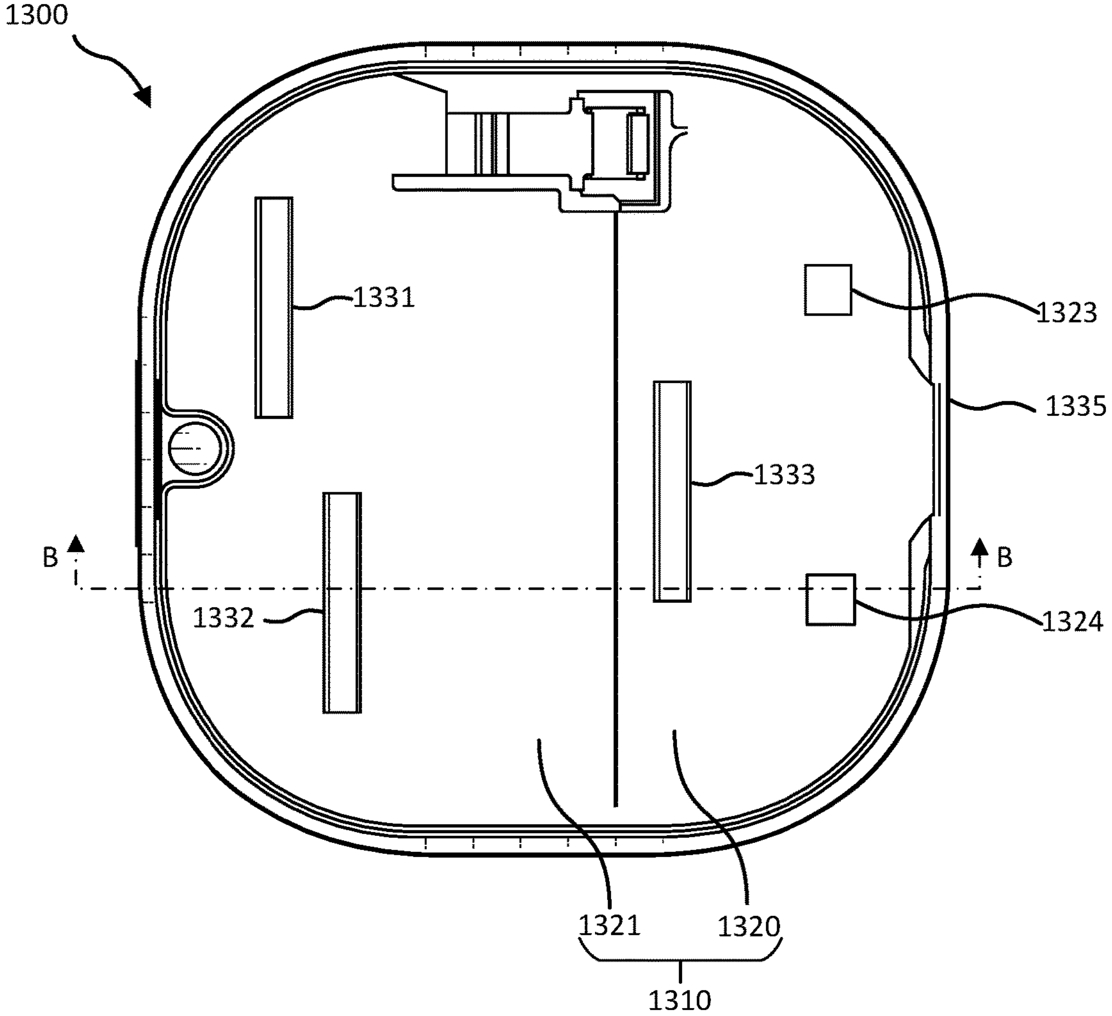
FIG. 13A is a plan view of a display shield with multiple grounding locations of an example watch body, according to at least one embodiment of the present disclosure.
Figure 13B:
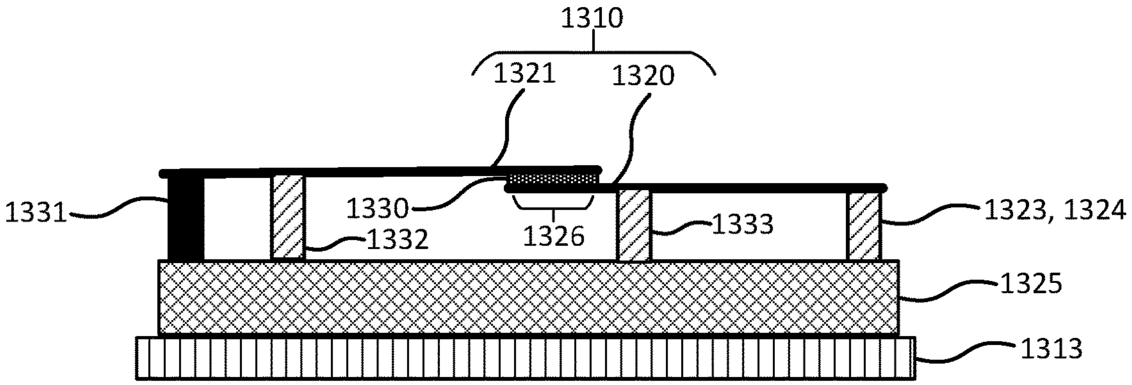
FIG. 13B is a cross-sectional view of a display shield with multiple grounding locations of an example watch body taken at line B-B in FIG. 13A, according to at least one embodiment of the present disclosure.

FIG. 13A is a plan view of a display shield 1310 with multiple grounding locations (e.g., multiple grounding locations disposed across multiple regions of display shield 1310) disposed in a watch body 1300. FIG. 13B is a cross-sectional view of display shield 1310 taken at line B-B in FIG. 13A. As described above with reference to FIG. 11, watch body 1300 may include display shield 1310 positioned between a display (e.g., display 1111 of FIG. 11) of watch body 1300 and a printed circuit board (e.g., printed circuit board 1313 of FIG. 13B). Display shield 1310 may be similar to display shield 1210 of FIGS. 12A and 12B with certain structural and functional differences. For example, display shield 1310 may be similar to display shield 1210 by including one or more conductive layers configured to cover an area under the display. Display shield 1310 may also include a flexible conductive portion 1320 adhered to and overlapping a metal sheet portion 1321 to form an electrical connection between flexible conductive portion 1320 and metal sheet portion 1321. Display shield 1310 may also cover an area substantially equal to the area of the display within an inner perimeter of watch body 1300 with a free space air gap between display shield 1310 and a watch body enclosure 1335.

Display shield 1310 may include a different number and different locations of grounding points as compared to display shield 1210. For example, display shield 1310 may include more grounding points at different locations (e.g., different regions of display shield 1310) compared to display shield 1210. Display shield 1310 may include grounding points 1323, 1324, 1331, 1332, and 1333. Grounding points 1323, 1324, 1331, 1332, and 1333 may each provide an electrical connection between display shield 1310 and an electrical ground of watch body 1300 (e.g., ground plane 708 of FIG. 7). Grounding points 1323, 1324, 1331, 1332, and 1333 may be located at different positions distributed across an area of display shield 1310, in comparison to display shield 1210 that includes grounding points at one location (e.g., at one end of display shield 1210). Although FIG. 13A shows five grounding points 1323, 1324, 1331, 1332, and 1333, the present disclosure is not so limited, and any number of ground points may be located at any position on display shield 1310.

FIG. 13B shows a cross-sectional side view of display shield 1310 connected to ground at multiple locations distributed across display shield 1310. Similar to display shield 1210, display shield 1310 may also include a flexible conductive portion 1320 adhered to and overlapping a metal sheet portion 1321 (e.g., a copper tape) to form an electrical connection between flexible conductive portion 1320 and metal sheet portion 1321. Overlapping area 1326 may connect flexible conductive portion 1320 to metal sheet portion 1321 using a conductive adhesive 1330 (e.g., a double side conductive adhesive tape, solder, etc.). Display shield 1310 may include grounding points 1323, 1324, 1331, 1332, and 1333. Grounding points 1323, 1324, 1331, 1332, and 1333 may each provide an electrical connection (e.g., metal clips, spring clips, solder connections, etc.) between display shield 1310 and an electrical ground of watch body 1300. Grounding points 1323, 1324, 1331, 1332, and 1333 may be positioned at multiple locations distributed across display shield 1310 as shown in FIG. 13B in order to reduce the impedance of display shield 1310 to ground. Grounding points 1323, 1324, 1331, 1332, and 1333 may be connected to a conductive shield 1325 that covers a portion of printed circuit board 1313. Conductive shield 1325 may be connected to a ground layer of printed circuit board 1313 to complete the connection between display shield 1310 and ground.

As described above with reference to FIGS. 12A and 12B, connecting display shield 1210 to ground at one end of display shield 1210 may increase the length and/or area of the PCB ground plane to improve the link margin and wireless performance of the watch body. In comparison, connecting display shield 1310 to ground at multiple locations across the area of display shield 1310 may move the PCB ground closer to the display. The display may include a thin conductive layer of indium tin oxide (ITO) that may be absorptive to the radiation produced by the antenna(s) of watch body 1300, thereby reducing the efficiency and performance of the antenna(s). To reduce the negative effects of the ITO on the performance of the antenna(s), display shield 1310 may be proximate to, and parallel with, the display. Display shield 1310 may be connected to ground at multiple locations distributed across display shield 1310 to reduce the amount of radiation produced by the antenna from being absorbed by the ITO layer of the display. In some examples, the configuration of display shield 1310 with multiple grounding points may reduce the antenna loss caused by absorption in the display by about 1.0 dB, by about 1.5 dB, by about 2.0 dB, or more.

Figure 14:
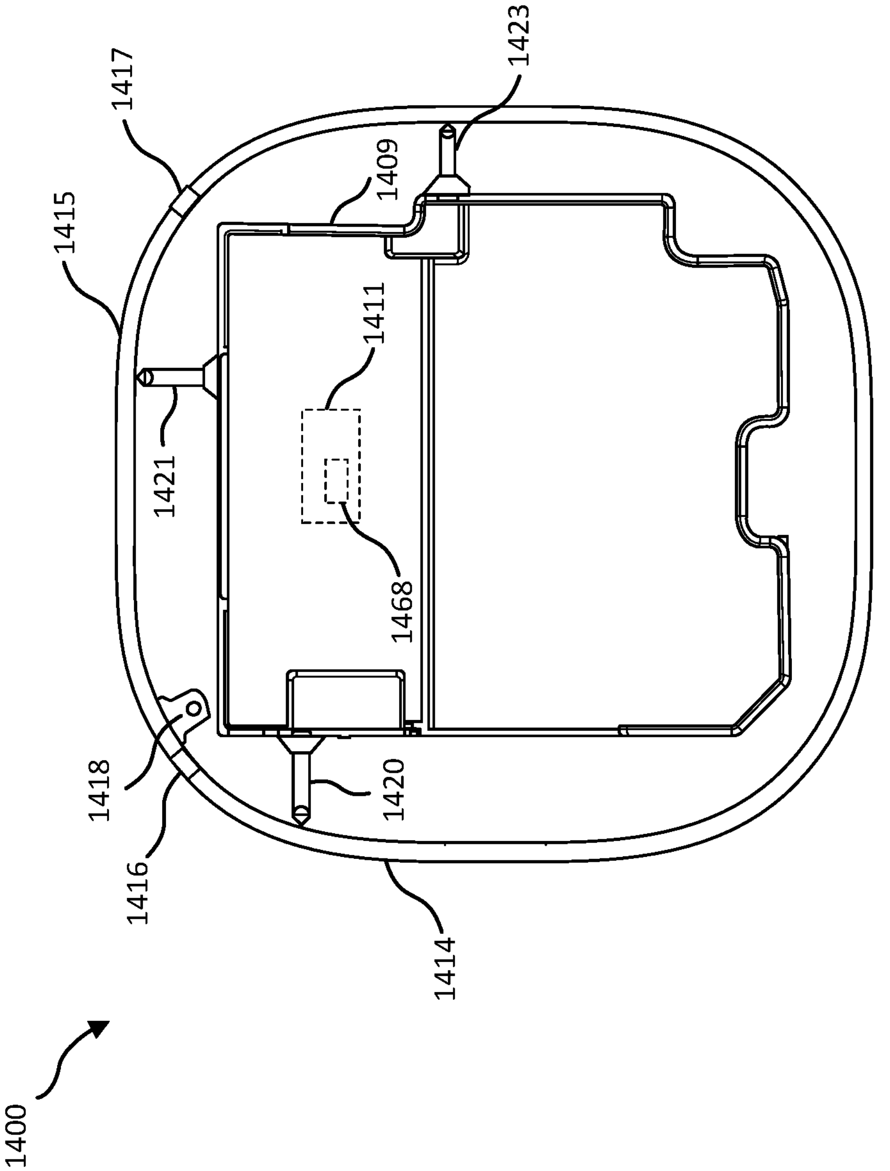
FIG. 14 is a cross-sectional plan view of at least one conductive enclosure antenna(s) of an example watch body, according to at least one embodiment of the present disclosure.

FIG. 14 is a cross-sectional plan view of enclosure antennas 1414, 1415 disposed in a watch body 1400. As shown in FIG. 14, watch body 1400 may include peripheral conductive enclosure members separated into segments by isolators 1416, 1417. The peripheral conductive enclosure members may be formed, for example, from a peripheral conductive enclosure band or a display bezel disposed around the four sides of watch body 1400. The peripheral conductive enclosure member may be formed from a conductive material including, without limitation, metal, stainless steel, aluminum, magnesium, metal alloy, or a combination thereof.

The peripheral conductive enclosure members may include enclosure antennas 1414, 1415. Although FIG. 14 shows two enclosure antennas 1414, 1415, the present disclosure is not so limited, and any number of enclosure antennas may be positioned at multiple locations around the perimeter of the enclosure of watch body 1400. For example, enclosure antenna 1415 may be located across a top portion of watch body 1400. The length of enclosure antenna 1415 may be defined by the distance between isolator 1416 and isolator 1417. The length of enclosure antenna 1415 may be based on a fraction of a wavelength of the electromagnetic radiation that enclosure antenna 1415 is configured to radiate. In some examples, enclosure antenna 1415 may be configured as a GNSS/WiFi/BT antenna radiator that radiates with at least one frequency in a frequency band of about 1500 MHz to about 2500 MHz.

Enclosure antenna 1414 may be located across multiple portions of the enclosure of watch body 1400. For example, enclosure antenna 1414 may be located on three sides of watch body 1400. Enclosure antenna 1414 may include a continuous conductive material disposed on the left, bottom, and right sides of watch body 1400 as shown in FIG. 14. When disposed on the left, bottom, and right sides of watch body 1400, enclosure antenna 1414 may effectively form a U-shaped antenna. In some examples, enclosure antenna 1415 may be configured as an LTE antenna radiator.

In some examples, isolators 1416, 1417 may physically separate enclosure antenna 1414 from enclosure antenna 1415. Isolator 1416 may physically and electrically separate the left side of enclosure antenna 1414 from the left side of enclosure antenna 1415. Isolator 1417 may physically and electrically separate the right side of enclosure antenna 1414 from the right side of enclosure antenna 1415. Isolators 1416, 1417 may be formed from a dielectric material (e.g., polymer, ceramic, glass, polyimide, plastic, etc.). The dielectric properties of isolators 1416, 1417 may electrically isolate enclosure antenna 1414 from enclosure antenna 1415. The electrical isolation provided by isolators 1416, 1417 may reduce interference in enclosure antennas 1414, 1415 and may improve wireless performance in watch body 1400.

In some examples, enclosure antenna 1415 may be configured as an inverted-F type antenna. When configured as an inverted-F type antenna, enclosure antenna 1415 may be positioned running parallel to a ground plane (e.g., a ground plane of printed circuit board 1409, display shield 1210 of FIGS. 12A and 12B connected to ground, etc.). Enclosure antenna 1415 may be connected to ground at one end. For example, enclosure antenna 1415 may be connected to ground through ground point 1418. Ground point 1418 may be electrically connected to a ground plane of printed circuit board 1409.

RF signals may be fed to enclosure antenna 1415 from RF circuit 1411 through an RF feed point 1421 (e.g., a press-fit connector) located at an intermediate point along enclosure antenna 1415. For example, enclosure antenna 1415 may be configured with an RF feed-point located at a distal end of enclosure antenna 1415 while ground point 1418 may be located towards a proximal end of enclosure antenna 1415.

In some examples, RF signals may be fed to enclosure antenna 1415 from RF circuit 1411 through conductive hardware components of watch body 1400. For example, RF feed points 1420, 1421, and/or 1423 may include any type of conductive hardware including, without limitation, screws, clips, rivets, bolts, couplings, nuts, anchors, dowels, rings, or a combination thereof.

In some examples, enclosure antenna 1414 may be configured as a monopole type antenna. When configured as a monopole antenna, enclosure antenna 1414 may not be connected to a ground point and may be connected to an RF circuit though an RF feed point. RF signals may be fed to enclosure antenna 1414 from RF circuit 1411 through an RF feed point located towards one end of enclosure antenna 1414. For example, enclosure antenna 1414 may be configured with an RF feed point 1420 located at the left side of watch body 1400 as shown in FIG. 14. Enclosure antenna 1414 may be isolated from ground by an air gap and/or a non-conductive material gap between enclosure antenna 1414 and the ground plane of printed circuit board 1409. The air gap and/or non-conductive material gap between enclosure antenna 1414 and the ground plane of printed circuit board 1409 may have a width of about 0.5 mm, about 1.0 mm, or about 1.5 mm.

In some examples, enclosure antenna 1414 may be connected to a tuner switch 1468 of RF circuit 1411 through tuner feed 1423 (e.g., a press-fit connector). As described in detail above with reference to FIG. 5, the tuner switch may switch inductive elements, capacitive elements, resistive elements, or any combination thereof in series and/or parallel with enclosure antenna 1414 in order to adjust a center frequency of enclosure antenna 1414 based on the state of a proximity sensor (e.g., sensor 114 of FIG. 1). The tuner switch of RF circuit 1411 may improve the low band LTE wireless performance (e.g., wireless coverage and/or bandwidth) in the frequency range of about 698 MHz to 960 MHz. In some examples, the tuner switch of RF circuit 1411 may improve the wireless performance of enclosure antenna 1414 by about 0.5 dB, by about 1.0 dB, by about 1.5 dB, or more.

In some examples, the tuner switch of RF circuit 1411 may convert enclosure antenna 1414 from a monopole antenna to a loop antenna by switching the tuner switch of RF circuit 1411 to ground (e.g., a ground plane of printed circuit board 1409) through a short circuit (e.g., short circuit 579 of FIG. 5). Shorting the tuner switch to ground may change an effective radiation geometry of enclosure antenna 1414 and convert it from a monopole antenna to a loop antenna. The tuner switch of RF circuit 1411 may convert enclosure antenna 1414 from a loop antenna to a monopole antenna by removing the short to ground and opening the short circuit.

Figure 15:
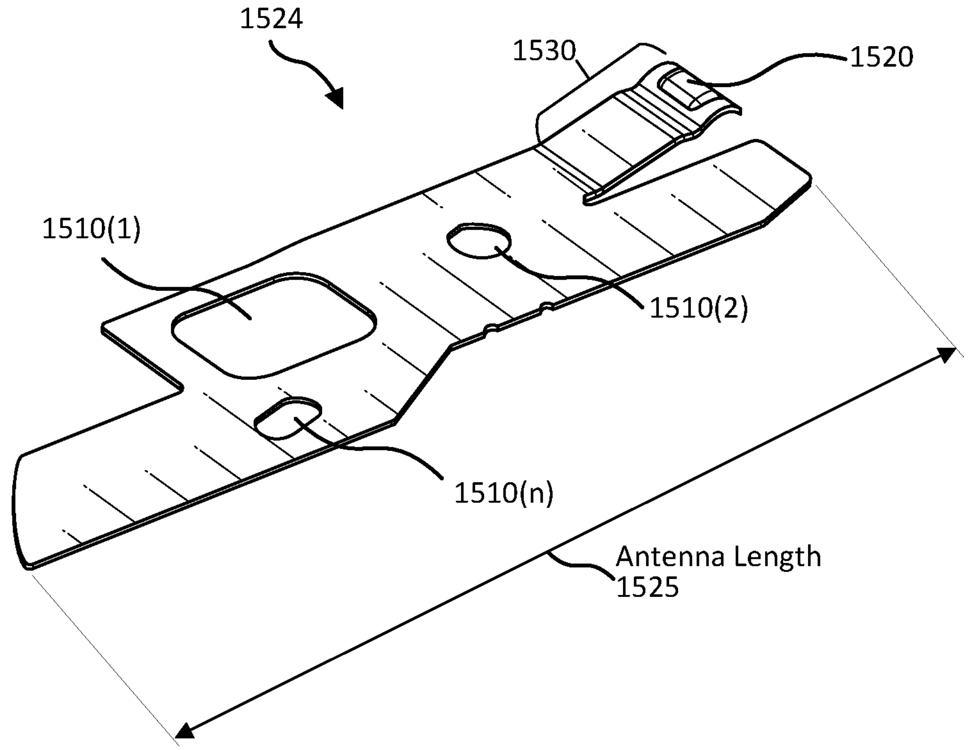
FIG. 15 is a perspective view of a branch antenna of an example watch body, according to at least one embodiment of the present disclosure.

FIG. 15 is a perspective view of a branch antenna 1514 of an example watch body. Branch antenna 1524 may be configured to transmit and receive wireless signals complying with the LTE wireless standard. In some example, branch antenna 1524 may be configured to transmit and receive wireless signals in conjunction with an enclosure antenna of the watch body (e.g., enclosure antenna 1414 of FIG. 14). As will be described in more detail below with reference to FIG. 16, branch antenna 1524 may be electrically connected to enclosure antenna 1414 through connector 1520. Branch antenna 1524 may include cutouts 1510(1) . . . **1510(*n*). In some examples, the watch body may include many mechanical and electrical components densely packaged into a small volume of the watch body. Cutouts 1510(1) . . . 1510(*n*) may be configured to allow branch antenna 1524 to fit within the small volume by accommodating other mechanical and/or electrical components (e.g., magnets, heat sinks, guide pins, etc.) disposed within cutouts 1510(1) . . . 1510(*n*). Branch antenna 1524** may coexist with the other mechanical and/or electrical components (e.g., magnets, heat sinks, guide pins, etc.) disposed within cutouts 1510(1) . . . 1510($n$) and experience minimal negative impacts on wireless performance due to cutouts 1510(1) . . . 1510($n$).

In some examples, branch antenna 1524 may include a substantially planar conductor (e.g., a metal sheet layer) connected to an RF circuit (e.g., RF circuit 1411 of FIG. 14). Branch antenna 1524 may be shaped substantially planar with the exception of connector tang 1530. Connector tang 1530 may be angled with respect to the major plane of branch antenna 1524 as shown in FIG. 15. Connector tang 1530 may be configured as a spring to provide a force between connector 1520 and a mating connector (e.g., mating connector on enclosure antenna 1614 as described below with reference to FIG. 16). Branch antenna 1524 may be configured with a length 1525. Length 1525 may be constrained based on the mechanical dimensions of the watch body. It may be desirable to maximize length 1525 to improve wireless performance of branch antenna 1524 while remaining within the physical constraints of the watch body. In some examples, length 1525 may be about 20 mm, about, 25 mm, or about 30 mm.

Figure 16:
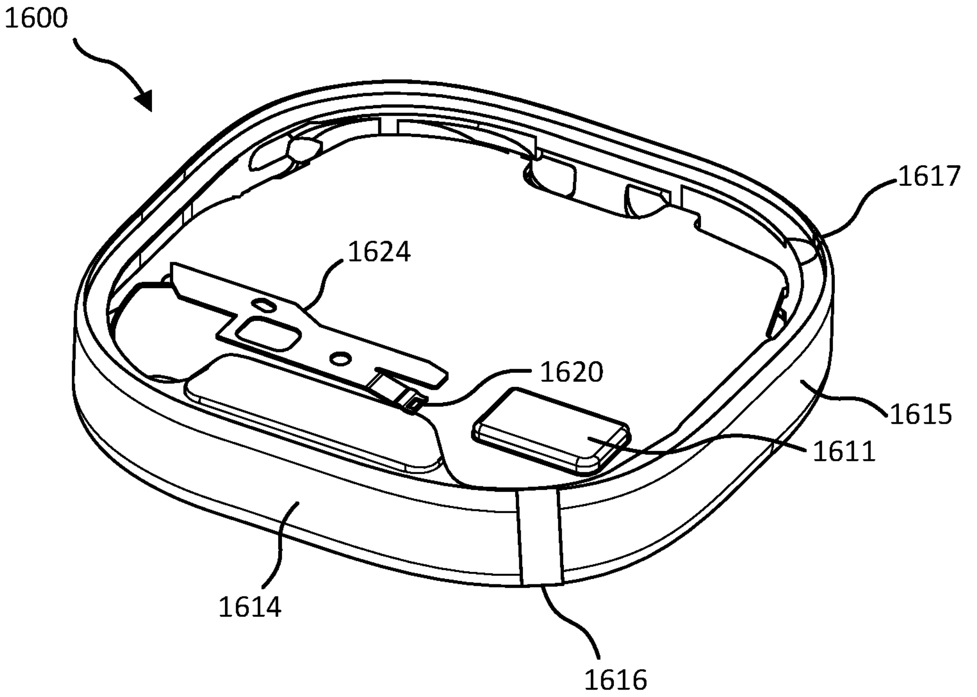
FIG. 16 is a perspective view of a branch antenna disposed in an example watch body, according to at least one embodiment of the present disclosure.

FIG. 16 is a perspective view of a branch antenna 1624 disposed in a watch body 1600. As described above with reference to FIG. 15, branch antenna 1624 may be configured to transmit and receive wireless signals complying with the LTE wireless standard. Branch antenna 1624 may be electrically connected to enclosure antenna 1614 and RF circuit 1611. Branch antenna 1624 may be electrically connected to enclosure antenna 1614 through connector 1620 (e.g., a spring clip connector). Connector 1620 may provide a direct connection between branch antenna 1624 and enclosure antenna 1614. In some examples, an electrical conductor may provide a connection between connector 1620 and enclosure antenna 1614.

As described in detail above with reference to FIG. 14, isolator 1616 and isolator 1617 may physically separate and electrically isolate enclosure antenna 1614 from enclosure antenna 1615. The position of branch antenna 1624 within the cavity of watch body 1600 may affect the amount of radiation transmitted over the air by branch antenna 1624. For example, branch antenna 1624 may be positioned proximate to the peripheral enclosure of watch body 1600. By placing branch antenna 1624 close to the enclosure of watch body 1600, transmission interference from internal components may be decreased and the total radiated power of branch antenna 1624 may be increased.

In some examples, when branch antenna 1624 is electrically connected to enclosure antenna 1614, the combination may create a dual-branch monopole antenna structure. The dual-branch monopole antenna structure may provide additional antenna length and/or antenna area for radiating wireless signals as compared to branch antenna 1624 or enclosure antenna 1614 radiating independently. The combined branch antenna 1624 and enclosure antenna 1614 may improve the wireless performance of watch body 1600. In some examples, the combined branch antenna 1624 and enclosure antenna 1614 may improve the LTE wireless performance by about 0.5 dB, by about 1.0 dB, by about 1.5 dB, or more. The combined branch antenna 1624 and enclosure antenna 1614 may particularly improve low band LTE wireless performance (e.g., wireless coverage and/or bandwidth) in the frequency range of about 698 MHz to 960 MHz.

Figure 17:
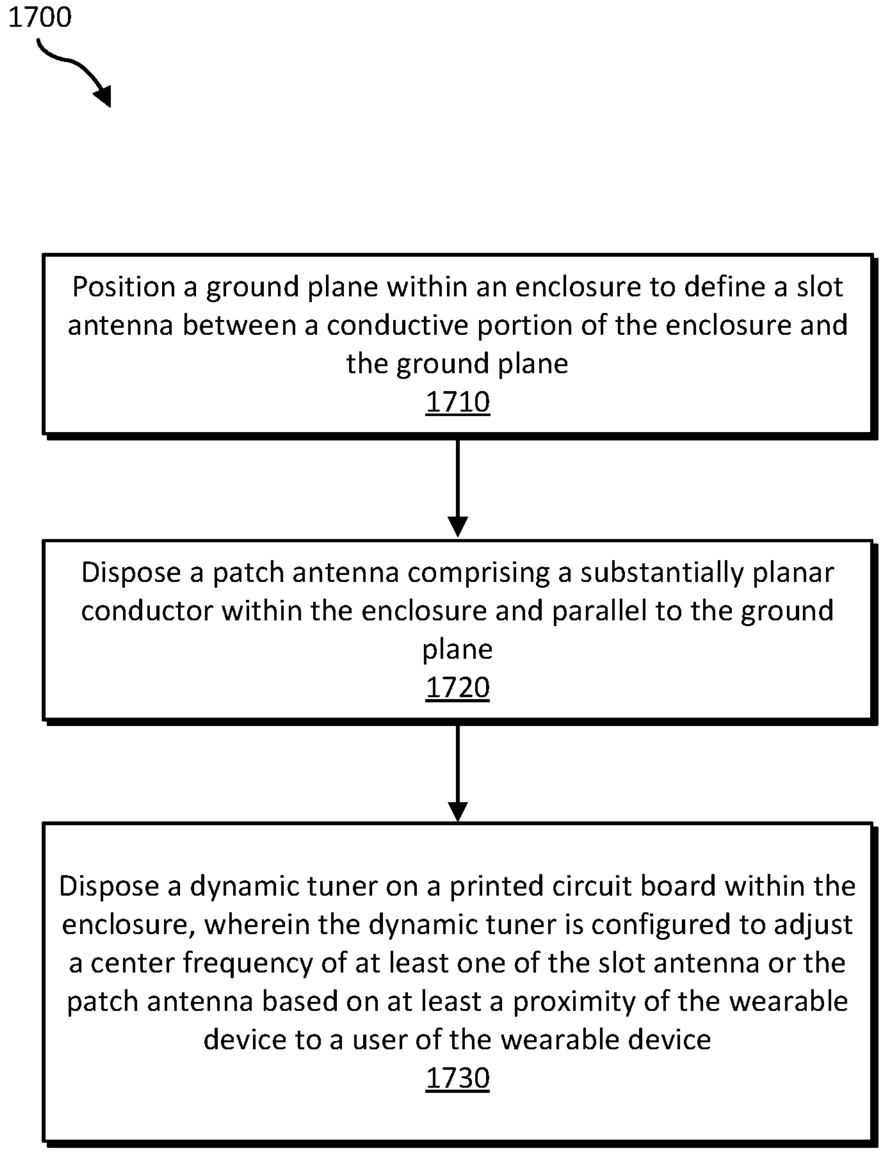
FIG. 17 is a flow diagram illustrating an example method of manufacturing an antenna system, according to at least one embodiment of the present disclosure.

FIG. 17 is a flow diagram illustrating an example method 1700 of manufacturing an antenna system, according to at least one embodiment of the present disclosure. At operation 1710, method 1700 may include positioning a ground plane within an enclosure to define a slot antenna between a conductive portion of the enclosure and the ground plane. Operation 1710 may be performed in a variety of ways, as will be understood by one skilled in the art considering the present disclosure. For example, the ground plane may include a planar layer of metal (e.g., copper) embedded within a printed circuit board (e.g., printed circuit board 713, 809, 1009, 1213, 1313). The printed circuit board may include components (e.g., processors, memory, connectors, RF circuits 411, 500, 711, 811, 1411, 1611, etc.) that enable wireless communications. The printed circuit board may be disposed within an enclosure of a mobile electronic device (e.g., a wearable device, a smartphone, a watch body, a smartwatch, etc.).

At operation 1720, a patch antenna comprising a substantially planar conductor may be disposed within the enclosure and parallel to the ground plane. Operation 1720 may be performed in a variety of ways, as will be understood by one skilled in the art considering the present disclosure. For example, the patch antenna may include a substantially planar layer of metal (e.g., copper) disposed within the enclosure proximate to and parallel to the ground plane of the printed circuit board (e.g., printed circuit board 713, 809, 1009, 1213, 1313).

At operation 1730, a dynamic tuner may be disposed on a printed circuit board within the enclosure, wherein the dynamic tuner is configured to adjust a center frequency of at least one of the slot antenna or the patch antenna based on at least a proximity of the wearable device to a user of the wearable device. The dynamic tuner may include at least one of a dynamic impedance tuner or a dynamic aperture tuner. Operation 1730 may be performed in a variety of ways, as will be understood by one skilled in the art considering the present disclosure. For example, the dynamic tuner may insert components (e.g., inductors, capacitors, resistors, etc.) in series and/or parallel with the slot antenna or the patch antenna. The inserted components may match the impedance of the slot antenna or the patch antenna with the impedance of an RF circuit (e.g., RF circuit 411, 500, 711, 811, 1411, 1611, etc.) driving the slot antenna or the patch antenna in order to improve the efficiency of the slot antenna or the patch antenna. The dynamic tuner may insert the impedance matching components based on the proximity of the slot antenna or the patch antenna to a human user. The proximity of the slot antenna or the patch antenna to the human user may be determined based on the state of a proximity sensor (e.g., sensor 114 of FIG. 1) in the wearable device.

As described in detail above, a wristband system may include a watch band that detachably couples to a watch body. The watch body may include a coupling mechanism for electrically and mechanically coupling the watch body to the watch band. The wristband system may have a split architecture that allows the watch band and the watch body to operate both independently and in communication with one another. The mechanical architecture may include a coupling mechanism on the watch band and/or the watch body that allows a user to conveniently attach and detach the watch body to and from the watch band. The watch body may include one or more antennas. When a user couples or decouples the watch body from the watch band, a proximity sensor may detect the proximity of the watch body to the user. A tuning circuit may match the impedance of the antennas to the impedance of a circuit driving the antennas based on the status of the proximity sensor. By matching the impedance of the antennas to the impedance of the driving circuit, the wireless communications performance of the watch body may be increased as compared to a watch body without a tuning circuit to match the impedance of the antennas to the impedance of the driving circuit.

In particular embodiments, one or more objects (e.g., data associated with sensors, and/or activity information) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, a biometric data acquisition application, an artificial-reality application, wristband system 100 of FIG. 1, wristband system 200 of FIG. 2, eyewear device 1802 of FIG. 18, virtual-reality system 1900 of FIG. 19, head-mounted display 2102 of FIG. 21, augmented-reality glasses 2220 of FIG. 22, or any other suitable computing system or application. Although the examples discussed herein are in the context of a wristband system and/or artificial-reality system, these privacy settings may be applied to any other suitable computing system.

Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within a wristband application and/or artificial-reality application. When privacy settings for an object allow a particular user or other entity to access that object, the object may be described as being "visible" with respect to that user or other entity. As an example and not by way of limitation, a user of the wristband application and/or artificial-reality application may specify privacy settings for a user-profile page that identify a set of users that may access the wristband application and/or artificial-reality application information on the user-profile page, thus excluding other users from accessing that information. As another example and not by way of limitation, wristband system 100 of FIG. 1, wristband system 200 of FIG. 2, eyewear device 1802 of FIG. 18, virtual-reality system 1900 of FIG. 19, head-mounted display 2102 of FIG. 21, augmented-reality glasses 2220 of FIG. 22 may store privacy policies/guidelines. The privacy policies/guidelines may specify what information of users may be accessible by which entities and/or by which processes (e.g., internal research, advertising algorithms, machine-learning algorithms, etc.), thus ensuring only certain information of the user may be accessed by certain entities or processes.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. Although this disclosure describes using particular privacy settings in a particular manner, this disclosure contemplates using any suitable privacy settings in any suitable manner.

Figure 18:
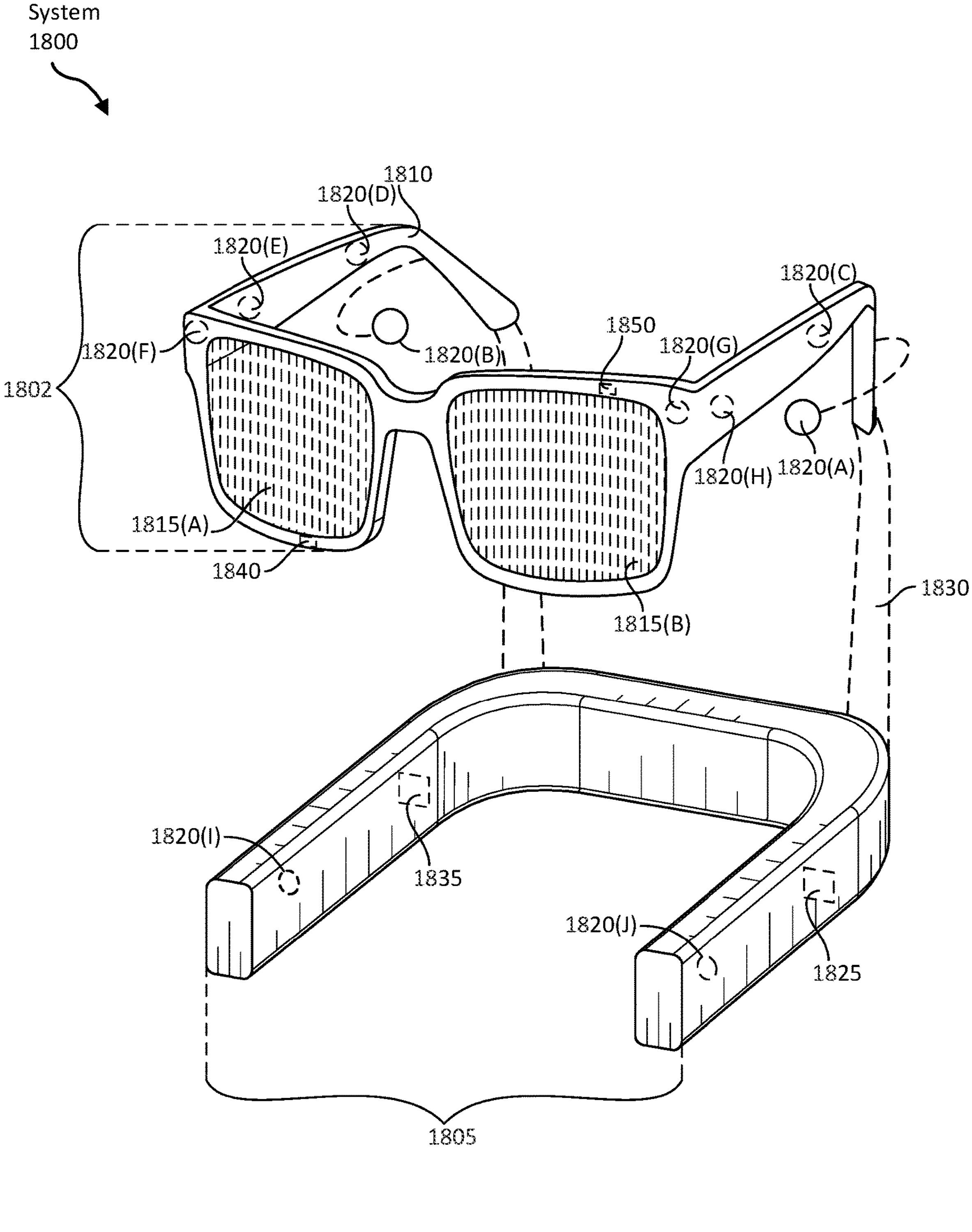
FIG. 18 is an illustration of exemplary augmented-reality glasses that may be used in connection with embodiments of this disclosure.
Figure 19:
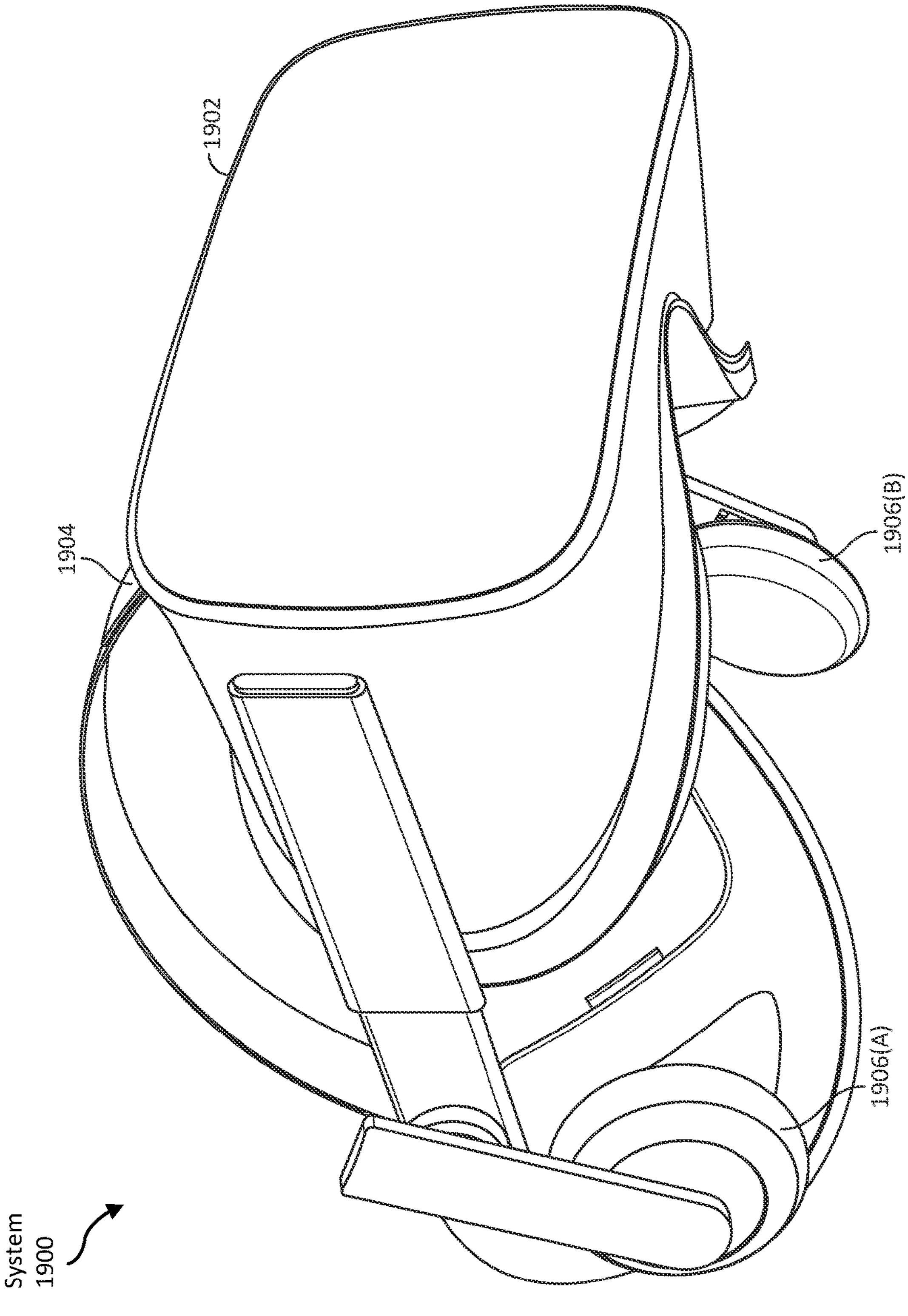
FIG. 19 is an illustration of an exemplary virtual-reality headset that may be used in connection with embodiments of this disclosure.
Figure 21:
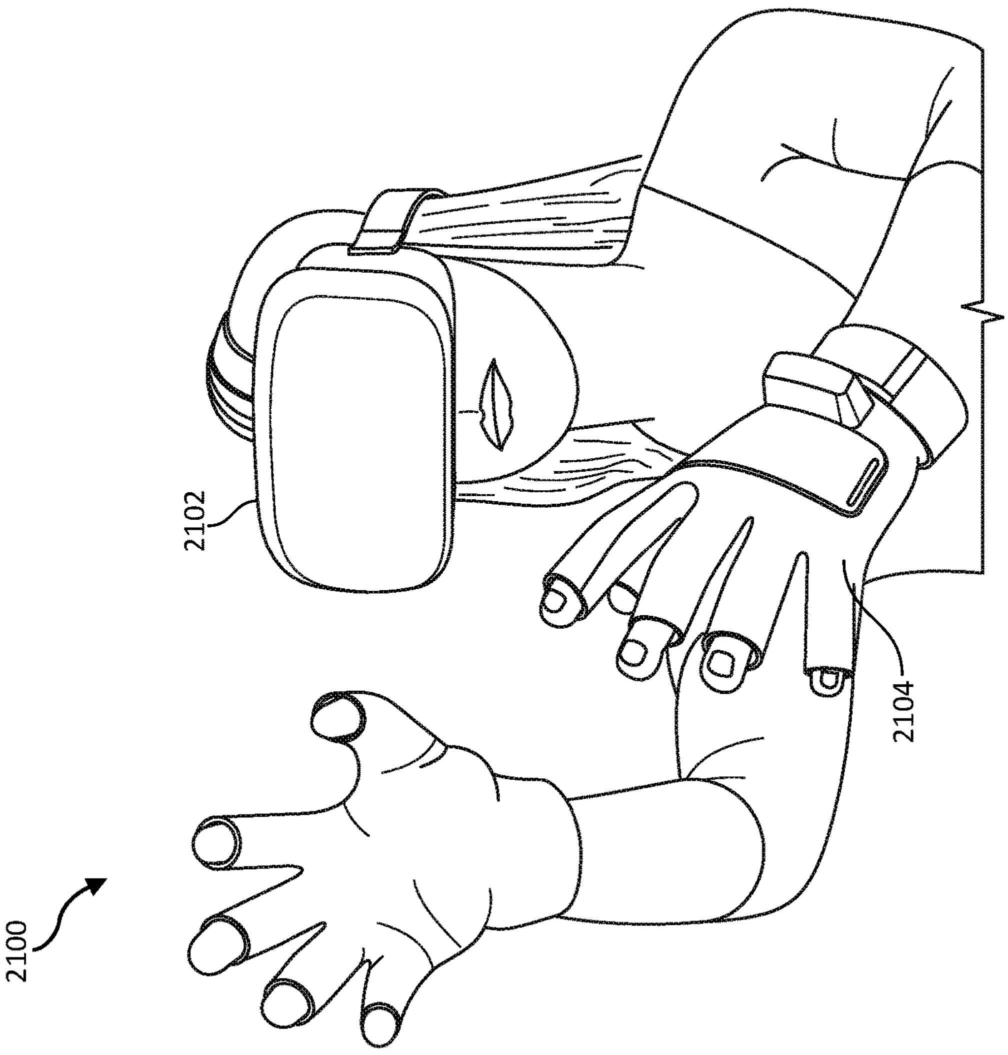
FIG. 21 is an illustration of an exemplary virtual-reality environment according to embodiments of this disclosure.
Figure 22:
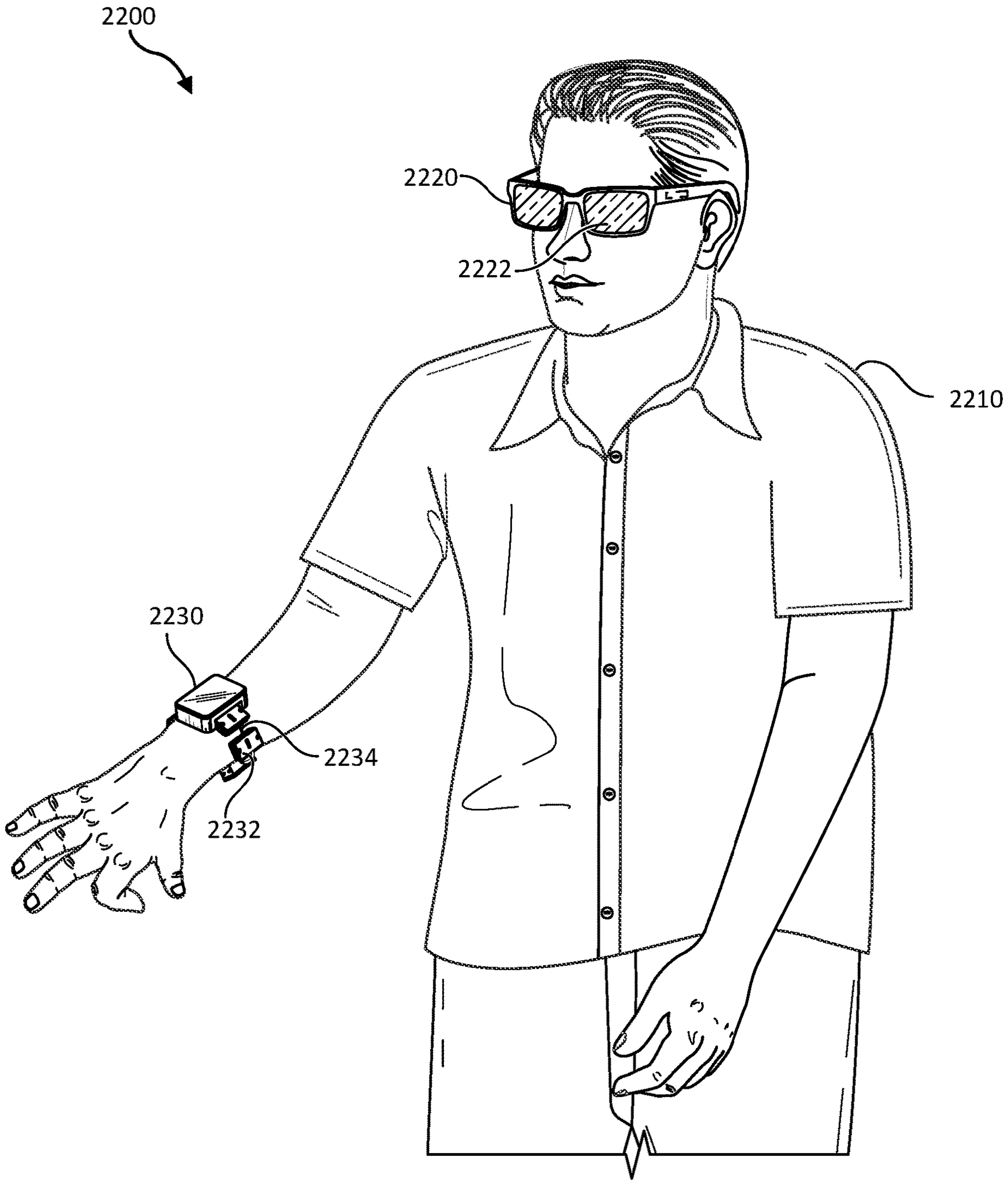
FIG. 22 is an illustration of an exemplary augmented-reality environment according to embodiments of this disclosure.

In particular embodiments, wristband system 100 of FIG. 1, wristband system 200 of FIG. 2, eyewear device 1802 of FIG. 18, virtual-reality system 1900 of FIG. 19, head-mounted display 2102 of FIG. 21, augmented-reality glasses 2220 of FIG. 22 may present a so-called "privacy wizard" (e.g., within a webpage, a module, one or more dialog boxes, a display screen of the wristband system, the display screen of the artificial-reality application, or any other suitable interface) to a first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof.

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, different objects of the same type associated with a user may have different privacy settings. In particular embodiments, one or more default privacy settings may be set for each object of a particular object-type.

In particular embodiments, wristband system 100 of FIG. 1, wristband system 200 of FIG. 2, eyewear device 1802 of FIG. 18, virtual-reality system 1900 of FIG. 19, head-mounted display 2102 of FIG. 21, augmented-reality glasses 2220 of FIG. 22 may have functionalities that may use, as inputs, biometric information of a user for user-authentication or experience-personalization purposes. A user may opt to make use of these functionalities to enhance their experience on the wristband system and/or artificial-reality system. As an example and not by way of limitation, a user may provide biometric information to the wristband system and/or artificial-reality system. The user's privacy settings may specify that such information may be used only for particular processes, such as authentication, and further specify that such information may not be shared with any third-party system or used for other processes or applications associated with the wristband system and/or artificial-reality system. As another example and not by way of limitation, the wristband system and/or artificial-reality system may provide a functionality for a user to provide biometric information to the wristband system and/or artificial-reality system. The user's privacy setting may specify that such biometric information may not be shared with any third-party system or used by other processes or applications associated with the wristband system and/or artificial-reality system. As another example and not by way of limitation, the wristband system and/or artificial-reality system may provide a functionality for a user to provide a reference image (e.g., a facial profile, a retinal scan) to the wristband system and/or artificial-reality system. The wristband system and/or artificial-reality system may compare the reference image against a later-received image input (e.g., to authenticate the user). The user's privacy setting may specify that such biometric information may be used only for a limited purpose (e.g., authentication), and further specify that such biometric information may not be shared with any third-party system or used by other processes or applications associated with the wristband system and/or artificial-reality system.

As described in detail above, the present disclosure details systems, devices, and methods related to an antenna architecture of a mobile electronic device (e.g., a wearable device). The antenna architecture may include multiple antennas that enable wireless communication for the mobile electronic device. The multiple antennas may include a slot antenna, a patch antenna, a trace antenna, a branch antenna, and/or an enclosure antenna. The antenna architecture may include an impedance tuning circuit that compensates for antenna performance loss when the mobile electronic device is proximate to a user. A proximity sensor may detect the proximity of the mobile electronic device to a user and match the impedance of the antennas to the impedance of a circuit driving the antennas thereby increasing the performance of the antennas and the performance of the wireless communications in the mobile electronic device.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1800 in FIG. 18) or that visually immerses a user in an artificial reality (such as, e.g., virtual-reality system 1900 in FIG. 19). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 18, augmented-reality system 1800 may include an eyewear device 1802 with a frame 1810 configured to hold a left display device 1815(A) and a right display device 1815(B) in front of a user's eyes. Display devices 1815(A) and 1815(B) may act together or independently to present an image or series of images to a user. While augmented-reality system 1800 includes two displays, embodiments of this disclosure may be implemented in augmented-reality systems with a single NED or more than two NEDs.

In some embodiments, augmented-reality system 1800 may include one or more sensors, such as sensor 1840. Sensor 1840 may generate measurement signals in response to motion of augmented-reality system 1800 and may be located on substantially any portion of frame 1810. Sensor 1840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1800 may or may not include sensor 1840 or may include more than one sensor. In embodiments in which sensor 1840 includes an IMU, the IMU may generate calibration data based on measurement signals from sensor 1840. Examples of sensor 1840 may include, without limitation, accelerometers, gyroscopes, magnetometers, other suitable types of sensors that detect motion, sensors used for error correction of the IMU, or some combination thereof.

In some examples, augmented-reality system 1800 may also include a microphone array with a plurality of acoustic transducers 1820(A)-1820(J), referred to collectively as acoustic transducers 1820. Acoustic transducers 1820 may represent transducers that detect air pressure variations induced by sound waves. Each acoustic transducer 1820 may be configured to detect sound and convert the detected sound into an electronic format (e.g., an analog or digital format). The microphone array in FIG. 19 may include, for example, ten acoustic transducers: 1820(A) and 1820(B), which may be designed to be placed inside a corresponding ear of the user, acoustic transducers 1820(C), 1820(D), 1820(E), 1820(F), 1820(G), and 1820(H), which may be positioned at various locations on frame 1810, and/or acoustic transducers 1820(1) and 1820(J), which may be positioned on a corresponding neckband 1805.

In some embodiments, one or more of acoustic transducers 1820(A)-(F) may be used as output transducers (e.g., speakers). For example, acoustic transducers 1820(A) and/or 1820(B) may be earbuds or any other suitable type of headphone or speaker.

The configuration of acoustic transducers 1820 of the microphone array may vary. While augmented-reality system 1800 is shown in FIG. 18 as having ten acoustic transducers 1820, the number of acoustic transducers 1820 may be greater or less than ten. In some embodiments, using higher numbers of acoustic transducers 1820 may increase the amount of audio information collected and/or the sensitivity and accuracy of the audio information. In contrast, using a lower number of acoustic transducers 1820 may decrease the computing power required by an associated controller 1850 to process the collected audio information. In addition, the position of each acoustic transducer 1820 of the microphone array may vary. For example, the position of an acoustic transducer 1820 may include a defined position on the user, a defined coordinate on frame 1810, an orientation associated with each acoustic transducer 1820, or some combination thereof.

Acoustic transducers 1820(A) and 1820(B) may be positioned on different parts of the user's ear, such as behind the pinna, behind the tragus, and/or within the auricle or fossa. Or, there may be additional acoustic transducers 1820 on or surrounding the ear in addition to acoustic transducers 1820 inside the ear canal. Having an acoustic transducer 1820 positioned next to an ear canal of a user may enable the microphone array to collect information on how sounds arrive at the ear canal. By positioning at least two of acoustic transducers 1820 on either side of a user's head (e.g., as binaural microphones), augmented-reality device 1800 may simulate binaural hearing and capture a 3D stereo sound field around about a user's head. In some embodiments, acoustic transducers 1820(A) and 1820(B) may be connected to augmented-reality system 1800 via a wired connection 1830, and in other embodiments acoustic transducers 1820(A) and 1820(B) may be connected to augmented-reality system 1800 via a wireless connection (e.g., a Bluetooth connection). In still other embodiments, acoustic transducers 1820(A) and 1820(B) may not be used at all in conjunction with augmented-reality system 1800.

Acoustic transducers 1820 on frame 1810 may be positioned in a variety of different ways, including along the length of the temples, across the bridge, above or below display devices 1815(A) and 1815(B), or some combination thereof. Acoustic transducers 1820 may also be oriented such that the microphone array is able to detect sounds in a wide range of directions surrounding the user wearing the augmented-reality system 1800. In some embodiments, an optimization process may be performed during manufacturing of augmented-reality system 1800 to determine relative positioning of each acoustic transducer 1820 in the microphone array.

In some examples, augmented-reality system 1800 may include or be connected to an external device (e.g., a paired device), such as neckband 1805. Neckband 1805 generally represents any type or form of paired device. Thus, the following discussion of neckband 1805 may also apply to various other paired devices, such as charging cases, smart watches, smart phones, wristbands, other wearable devices, hand-held controllers, tablet computers, laptop computers, other external compute devices, etc.

As shown, neckband 1805 may be coupled to eyewear device 1802 via one or more connectors. The connectors may be wired or wireless and may include electrical and/or non-electrical (e.g., structural) components. In some cases, eyewear device 1802 and neckband 1805 may operate independently without any wired or wireless connection between them. While FIG. 18 illustrates the components of eyewear device 1802 and neckband 1805 in example locations on eyewear device 1802 and neckband 1805, the components may be located elsewhere and/or distributed differently on eyewear device 1802 and/or neckband 1805. In some embodiments, the components of eyewear device 1802 and neckband 1805 may be located on one or more additional peripheral devices paired with eyewear device 1802, neckband 1805, or some combination thereof.

Pairing external devices, such as neckband 1805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1800 may be provided by a paired device or shared between a paired device and an eyewear device, thus reducing the weight, heat profile, and form factor of the eyewear device overall while still retaining desired functionality. For example, neckband 1805 may allow components that would otherwise be included on an eyewear device to be included in neckband 1805 since users may tolerate a heavier weight load on their shoulders than they would tolerate on their heads. Neckband 1805 may also have a larger surface area over which to diffuse and disperse heat to the ambient environment. Thus, neckband 1805 may allow for greater battery and computation capacity than might otherwise have been possible on a stand-alone eyewear device. Since weight carried in neckband 1805 may be less invasive to a user than weight carried in eyewear device 1802, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1805 may be communicatively coupled with eyewear device 1802 and/or to other devices. These other devices may provide certain functions (e.g., tracking, localizing, depth mapping, processing, storage, etc.) to augmented-reality system 1800. In the embodiment of FIG. 18, neckband 1805 may include two acoustic transducers (e.g., 1820(1) and 1820(J)) that are part of the microphone array (or potentially form their own microphone subarray). Neckband 1805 may also include a controller 1825 and a power source 1835.

Acoustic transducers 1820(1) and 1820(J) of neckband 1805 may be configured to detect sound and convert the detected sound into an electronic format (analog or digital). In the embodiment of FIG. 18, acoustic transducers 1820(1) and 1820(J) may be positioned on neckband 1805, thereby increasing the distance between the neckband acoustic transducers 1820(1) and 1820(J) and other acoustic transducers 1820 positioned on eyewear device 1802. In some cases, increasing the distance between acoustic transducers 1820 of the microphone array may improve the accuracy of beamforming performed via the microphone array. For example, if a sound is detected by acoustic transducers 1820(C) and 1820(D) and the distance between acoustic transducers 1820(C) and 1820(D) is greater than, e.g., the distance between acoustic transducers 1820(D) and 1820(E), the determined source location of the detected sound may be more accurate than if the sound had been detected by acoustic transducers 1820(D) and 1820(E).

Controller 1825 of neckband 1805 may process information generated by the sensors on neckband 1805 and/or augmented-reality system 1800. For example, controller 1825 may process information from the microphone array that describes sounds detected by the microphone array. For each detected sound, controller 1825 may perform a direction-of-arrival (DOA) estimation to estimate a direction from which the detected sound arrived at the microphone array. As the microphone array detects sounds, controller 1825 may populate an audio data set with the information. In embodiments in which augmented-reality system 1800 includes an inertial measurement unit, controller 1825 may compute all inertial and spatial calculations from the IMU located on eyewear device 1802. A connector may convey information between augmented-reality system 1800 and neckband 1805 and between augmented-reality system 1800 and controller 1825. The information may be in the form of optical data, electrical data, wireless data, or any other transmittable data form. Moving the processing of information generated by augmented-reality system 1800 to neckband 1805 may reduce weight and heat in eyewear device 1802, making it more comfortable to the user.

Power source 1835 in neckband 1805 may provide power to eyewear device 1802 and/or to neckband 1805. Power source 1835 may include, without limitation, lithium ion batteries, lithium-polymer batteries, primary lithium batteries, alkaline batteries, or any other form of power storage. In some cases, power source 1835 may be a wired power source. Including power source 1835 on neckband 1805 instead of on eyewear device 1802 may help better distribute the weight and heat generated by power source 1835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1900 in FIG. 19, that mostly or completely covers a user's field of view. Virtual-reality system 1900 may include a front rigid body 1902 and a band 1904 shaped to fit around a user's head. Virtual-reality system 1900 may also include output audio transducers 1906(A) and 1906(B). Furthermore, while not shown in FIG. 19, front rigid body 1902 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1800 and/or virtual-reality system 1900 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1800 and/or virtual-reality system 1900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1800 and/or virtual-reality system 1900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1800 and 1900 of FIGS. 18 and 19, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

As noted, artificial-reality systems 1800 and 1900 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 20:
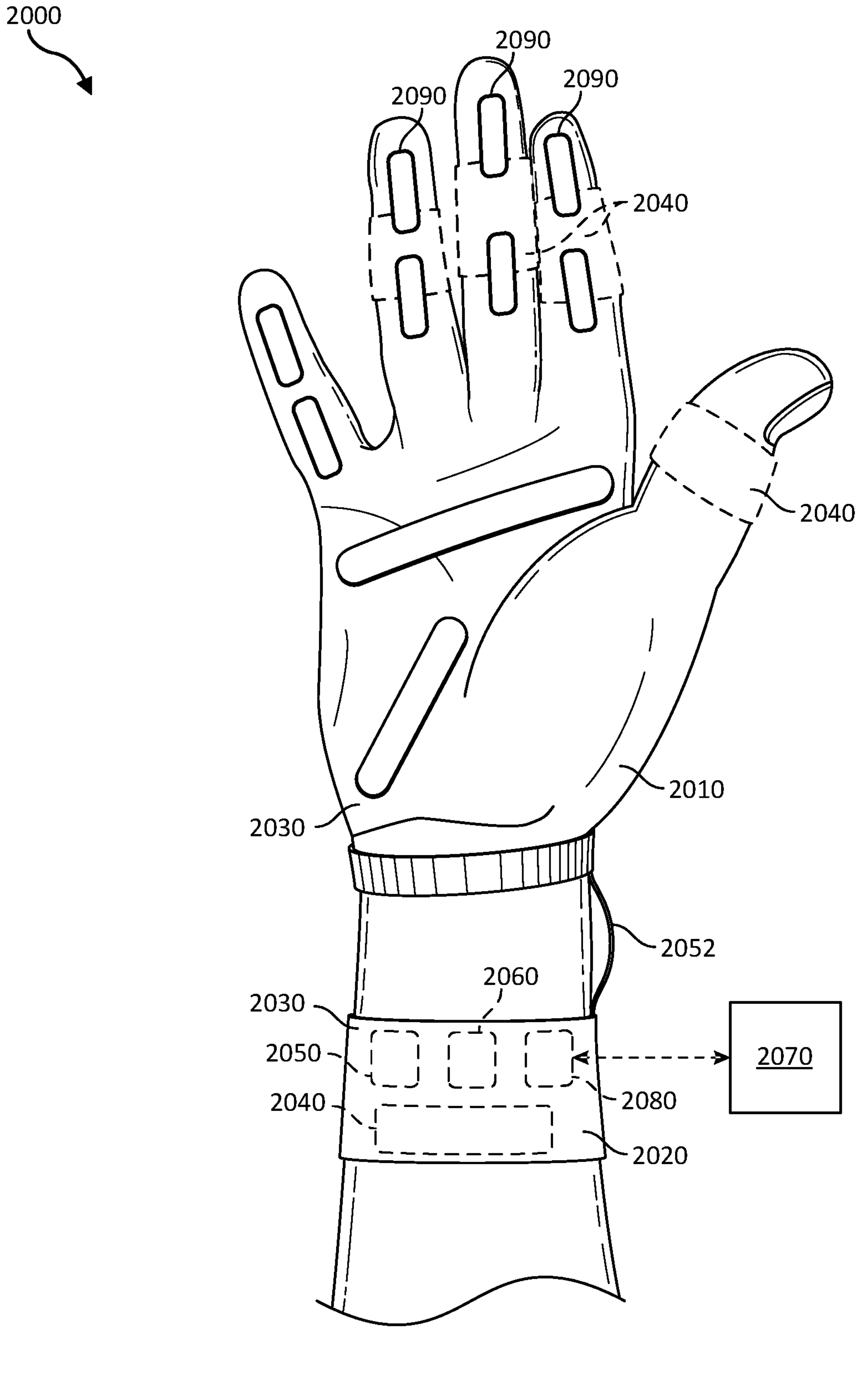
FIG. 20 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands (e.g., such as wristband systems 100 and 200, described above), etc.). As an example, FIG. 20 illustrates a vibrotactile system 2000 in the form of a wearable glove (haptic device 2010) and wristband (e.g., wristband system 100 of FIG. 1, haptic device 2020). Haptic device 2010 and haptic device 2020 are shown as examples of wearable devices that include a flexible, wearable textile material 2030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a wristband, a watch band, a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 2040 may be positioned at least partially within one or more corresponding pockets formed in textile material 2030 of vibrotactile system 2000. Vibrotactile devices 2040 may be positioned in locations to provide a vibrating sensation (e.g., haptic feedback) to a user of vibrotactile system 2000. For example, vibrotactile devices 2040 may be positioned against the user's finger(s), thumb, or wrist, as shown in FIG. 20. Vibrotactile devices 2040 may, in some examples, be sufficiently flexible to conform to or bend with the user's corresponding body part(s).

A power source 2050 for applying a voltage to the vibrotactile devices 2040 for activation thereof may be electrically coupled to vibrotactile devices 2040, such as via conductive wiring 2052. In some examples, each of vibrotactile devices 2040 may be independently electrically coupled to power source 2050 for individual activation. In some embodiments, a processor 2060 may be operatively coupled to power source 2050 and configured (e.g., programmed) to control activation of vibrotactile devices 2040.

Vibrotactile system 2000 may be implemented in a variety of ways. In some examples, vibrotactile system 2000 may be a standalone system with integral subsystems and components for operation independent of other devices and systems. As another example, vibrotactile system 2000 may be configured for interaction with another device or system 2070. For example, vibrotactile system 2000 may, in some examples, include a communications interface 2080 for receiving and/or sending signals to the other device or system 2070. The other device or system 2070 may be watch body 300, a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 2080 may enable communications between vibrotactile system 2000 and the other device or system 2070 via a wireless link or a wired link. If present, communications interface 2080 may be in communication with processor 2060, such as to provide a signal to processor 2060 to activate or deactivate one or more of the vibrotactile devices 2040.

Vibrotactile system 2000 may optionally include other subsystems and components, such as touch-sensitive pads 2090, pressure sensors, motion sensors, position sensors, lighting elements, and/or user interface elements (e.g., an on/off button, a vibration control element, etc.). During use, vibrotactile devices 2040 may be configured to be activated for a variety of different reasons, such as in response to the user's interaction with user interface elements, a signal from the motion or position sensors, a signal from the touch-sensitive pads 2090, a signal from the pressure sensors, a signal from the other device or system 2070, etc.

Although power source 2050, processor 2060, and communications interface 2080 are illustrated in FIG. 20 as being positioned in haptic device 2020, the present disclosure is not so limited. For example, one or more of power source 2050, processor 2060, or communications interface 2080 may be positioned within haptic device 2010 or within another wearable textile.

Haptic wearables, such as those shown in and described in connection with FIG. 20, may be implemented in a variety of types of artificial-reality systems and environments. FIG. 21 shows an example artificial-reality environment 2100 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 2102 generally represents any type or form of virtual-reality system, such as virtual-reality system 1900 in FIG. 19. Haptic device 2104 generally represents any type or form of wearable device, worn by a user of an artificial-reality system, that provides haptic feedback to the user to give the user the perception that he or she is physically engaging with a virtual object. In some embodiments, haptic device 2104 may provide haptic feedback by applying vibration, motion, and/or force to the user. For example, haptic device 2104 may limit or augment a user's movement. To give a specific example, haptic device 2104 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 2104 to send action requests to a console. Examples of action requests include, without limitation, requests to start an application and/or end the application and/or requests to perform a particular action within the application.

While haptic interfaces may be used with virtual-reality systems, as shown in FIG. 21, haptic interfaces may also be used with augmented-reality systems, as shown in FIG. 22. FIG. 22 is a perspective view of a user 2210 interacting with an augmented-reality system 2200. In this example, user 2210 may wear a pair of augmented-reality glasses 2220 that may have one or more displays 2222 and that are paired with a haptic device 2230. In this example, haptic device 2230 may be a wristband (e.g., such as wristband system 100 and wristband system 200 described above) that includes a plurality of band elements 2232 and a tensioning mechanism 2234 that connects band elements 2232 to one another.

One or more of band elements 2232 may include any type or form of actuator suitable for providing haptic feedback. For example, one or more of band elements 2232 may be configured to provide one or more of various types of cutaneous feedback, including vibration, force, traction, texture, and/or temperature. To provide such feedback, band elements 2232 may include one or more of various types of actuators. In one example, each of band elements 2232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 2010, 2020, 2104, and 2230 may include any suitable number and/or type of haptic transducer, sensor, and/or feedback mechanism. For example, haptic devices 2010, 2020, 2104, and 2230 may include one or more mechanical transducers, piezoelectric transducers, and/or fluidic transducers. Haptic devices 2010, 2020, 2104, and 2230 may also include various combinations of different types and forms of transducers that work together or independently to enhance a user's artificial-reality experience. In one example, each of band elements 2232 of haptic device 2230 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A smartwatch including a watch body, a watch band configured to detachably support the watch body, at least one antenna in the watch body, the at least one antenna configured to radiate electromagnetic signals, a radio frequency transceiver in the watch body, and a dynamic tuner operably coupled to the radio frequency transceiver and a ground plane in the watch body, wherein the radio frequency transceiver is configured to control the dynamic tuner to adjust a center frequency of the at least one antenna based on at least a proximity of the watch body to the watch band.

Example 2: The smartwatch of Example 1, wherein the radio frequency transceiver is further configured to control the dynamic tuner to adjust a center frequency of the at least one antenna based on at least a proximity of the watch body to a user of the watch body.

Example 3: The smartwatch of Example 2, further comprising a proximity sensor, wherein the proximity sensor determines the proximity of the user to the watch body.

Example 4: The smartwatch of Example 3, wherein the proximity sensor comprises a heart rate monitor sensor.

Example 5: The smartwatch of any of Examples 1 through 4, wherein the dynamic tuner is further configured to adjust the center frequency of the at least one antenna by switching an impedance tuning element between the radio frequency transceiver and the at least one antenna.

Example 6: The smartwatch of Example 5, wherein the impedance tuning element comprises at least one of a variable inductive element or a variable capacitive element.

Example 7: The smartwatch of Example 5, wherein the impedance tuning element comprises at least one of an inductor, a capacitor, a short circuit, or an open circuit.

Example 8: The smartwatch of Example 7, wherein the impedance tuning element comprises the short circuit and the dynamic tuner is configured to convert the at least one antenna from a monopole antenna to a loop antenna by switching the short circuit between the at least one antenna and the ground plane.

Example 9: The smartwatch of Example 8, further comprising a printed circuit board, wherein the ground plane comprises a conductive layer of the printed circuit board.

Example 10: The smartwatch of any of any of Examples 1 through 9, further comprising a conductive enclosure of the watch body and at least two non-conductive isolators positioned along the conductive enclosure, wherein the at least one antenna comprises a portion of the conductive enclosure defined between the at least two non-conductive isolators.

Example 11: The smartwatch of any of Examples 1 through 10, further comprising a conductive enclosure of the watch body and at least two non-conductive isolators positioned on a perimeter of the conductive enclosure, wherein a first portion of the conductive enclosure defined between the at least two non-conductive isolators forms at least a portion of a first antenna being used for wireless communication in a first wireless communication band and a second portion of the conductive enclosure defined between the at least two non-conductive isolators forms a second antenna being used for wireless communication in a second wireless communication band different from the first wireless communication band.

Example 12: The smartwatch of any of Examples 1 through 11, further comprising a branch antenna within the watch body and selectively coupled to the at least one antenna a cradle comprising a conductive material configured for mounting an enclosure of the watch body to the watch band and a cradle gap disposed between the cradle and the enclosure, wherein electromagnetic signals radiated by the branch antenna radiate through the cradle gap.

Example 13: The smartwatch of any of Example 12, wherein the cradle gap comprises a non-conductive material disposed between the cradle and the enclosure and a thickness of the cradle gap is greater than or equal to about 1 mm.

Example 14: The smartwatch of any of Examples 1 through 13, further comprising a display for displaying content on the watch body and a display shield disposed between the display and the ground plane, wherein the ground plane is electrically coupled to the display shield at a plurality of locations distributed over an area of the display shield and the display shield is configured to improve a transmission efficiency of the at least one antenna by inhibiting radiation transmitted by the at least one antenna from being absorbed by the display.

Example 15: The smartwatch of any of Examples 1 through 14, further comprising a display for displaying content on the watch body, and a display shield disposed between the display and the ground plane, wherein the at least one antenna comprises a monopole antenna, the ground plane is electrically coupled to the display shield along a single side of the display shield, and the display shield is configured to improve a transmission efficiency of the monopole antenna by increasing an area of the ground plane.

Example 16: A mobile electronic device including a conductive enclosure, a dynamic tuner, at least two non-conductive isolators positioned on a perimeter of the conductive enclosure, wherein a first portion of the conductive enclosure defined between the at least two non-conductive isolators forms a first antenna and a second portion of the conductive enclosure defined between the at least two non-conductive isolators forms a second antenna, and at least one proximity sensor that is configured to determine a proximity of the mobile electronic device to a user of the mobile electronic device, wherein the dynamic tuner is configured to adjust a center frequency of at least one of the first antenna or the second antenna based on data from the at least one proximity sensor.

Example 17: The mobile electronic device of Example 16, wherein the first antenna is configured to radiate with at least one frequency in a frequency band of about 1500 MHz to about 2500 MHz.

Example 18: The mobile electronic device of Example 16 or Example 17, wherein the second antenna is configured to radiate with at least one frequency in a frequency band of about 698 MHz to about 960 MHz.

Example 19: A wearable device including a conductive enclosure, a radio frequency transceiver, at least one antenna defined by a portion of the conductive enclosure positioned on a perimeter of the conductive enclosure, the at least one antenna configured to radiate electromagnetic signals, a branch antenna comprising a substantially planar conductor, and a dynamic tuner operably coupled to the radio frequency transceiver, wherein the radio frequency transceiver is configured to control the dynamic tuner to adjust a center frequency of at least one of the branch antenna or the at least one antenna based on at least a proximity of the wearable device to a user of the wearable device.

Example 20: The wearable device of Example 19, wherein the branch antenna is selectively electrically coupled to the at least one antenna and a total radiated power of the electromagnetic signals increases when a combined length of the branch antenna and the at least one antenna is used to radiate the electromagnetic signals compared to using only the at least one antenna to radiate the electromagnetic signals.

Example 21: A mobile electronic device, including a display, an enclosure supporting the display and comprising a conductive portion, a ground plane positioned within the enclosure, wherein a gap defined between the conductive portion of the enclosure and the ground plane forms a slot antenna that is configured to radiate first electromagnetic signals through a portion of the display, the first electromagnetic signals radiated by the slot antenna being used for wireless communication in a first wireless communication band, and a patch antenna, comprising a substantially planar conductor, that is configured to radiate second electromagnetic signals, the second electromagnetic signals radiated by the patch antenna being used for wireless communication in a second wireless communication band different from the first wireless communication band.

Example 22: The mobile electronic device of Example 21, wherein the substantially planar conductor of the patch antenna is disposed parallel and proximate to a non-conducting portion of the enclosure and the patch antenna radiates through at least an outer perimeter of the non-conducting portion of the enclosure.

Example 23: The mobile electronic device of Example 21 or Example 22, further comprising a printed circuit board, wherein the ground plane of the mobile electronic device comprises a conductive layer of the printed circuit board.

Example 24: The mobile electronic device of any of Examples 21 through 23, wherein the gap between the conductive portion of the enclosure and the ground plane comprises a free space air gap having a width greater than or equal to about 1 mm.

Example 25: The mobile electronic device of Example 24, wherein the free space air gap extends along a perimeter of the enclosure of the mobile electronic device.

Example 26: The mobile electronic device of any of Examples 21 through 25, further comprising a cradle comprising a conductive material configured for mounting the enclosure and a cradle gap comprising a non-conductive material disposed between the cradle and the enclosure when the enclosure is mounted on the cradle, wherein the first electromagnetic signals radiated by the slot antenna also radiate through the cradle gap.

Example 27: The mobile electronic device of any of Examples 21 through 26, a radio frequency (RF) transceiver and a dynamic tuner that is configured to adjust a center frequency of the slot antenna by switching an impedance tuning element between the RF transceiver and the slot antenna, and adjust a center frequency of the patch antenna by switching the impedance tuning element between the ground plane and the patch antenna.

Example 28: The mobile electronic device of Example 27, further comprising at least one proximity sensor that is configured to determine a proximity of the mobile electronic device to a user of the mobile electronic device, wherein the dynamic tuner is configured to adjust the center frequency of at least one of the slot antenna or the patch antenna based on a state of the at least one proximity sensor.

Example 29: The mobile electronic device of any of Examples 21 through 28, further comprising a battery comprising a conductive outer casing, wherein a gap defined between the conductive portion of the enclosure and the conductive outer casing of the battery forms the slot antenna that is configured to radiate the first electromagnetic signals through the portion of the display.

Example 30: The mobile electronic device of any of Examples 21 through 29, wherein the enclosure further comprises a non-conductive portion disposed at a lower portion of the enclosure and the slot antenna is further configured to radiate the first electromagnetic signals through the non-conductive portion of the enclosure.

Example 31: The mobile electronic device of any of Examples 21 through 30, further comprising a display shield disposed between the display and the ground plane, wherein the display shield is configured to improve a transmission efficiency of the slot antenna by inhibiting the first electromagnetic signals from being absorbed by the display.

Example 32: The mobile electronic device of any of Examples 21 through 31, further comprising a display shield disposed between the display and the ground plane, wherein the display shield is configured to insulate the display from radiation from the slot antenna.

Example 33: The mobile electronic device of any of Examples 21 through 32, further comprising a printed circuit board, a sensor substrate, an isolating gap between the patch antenna and the sensor substrate, and a flexible cable disposed in the isolating gap that connects the printed circuit board to the sensor substrate, wherein the isolating gap is configured to electrically isolate the patch antenna from the sensor substrate.

Example 34: The mobile electronic device of any of Examples 21 through 33, further comprising a printed circuit board, a sensor substrate, and a battery comprising a conductive outer casing, wherein the battery is disposed between the printed circuit board and the sensor substrate and the conductive outer casing of the battery is configured to create a low impedance path between the sensor substrate and the printed circuit board to inhibit ground loop interference effects on the patch antenna.

Example 35: The mobile electronic device of any of Examples 21 through 34, further comprising a trace feeding element disposed proximate to an inner portion of the enclosure, wherein the trace feeding element is configured to generate an electric field that capacitively couples the trace feeding element to the enclosure.

Example 36: The mobile electronic device of any of Examples 21 through 35, wherein the slot antenna is configured to radiate with at least one frequency in a frequency band of about 1500 MHz to about 2500 MHz.

Example 37: The mobile electronic device of any of Examples 21 through 36, wherein the patch antenna is configured as a monopole antenna to radiate with at least one frequency in a frequency band of about 698 MHz to about 960 MHz.

Example 38: The mobile electronic device of any of Examples 21 through 37, further comprising a controller that is configured to determine a frequency band and control the radiation of the first electromagnetic signals and the second electromagnetic signals based on the determined frequency band.

Example 39: A mobile electronic device, including a slot antenna comprising a radiating slot defined by a gap between a conductive portion of an enclosure of the mobile electronic device and a ground plane of the mobile electronic device, a patch antenna comprising a substantially planar conductor, and a dynamic impedance tuner configured to adjust a center frequency of at least one of the slot antenna or the patch antenna based on at least a proximity of the mobile electronic device to an object.

Example 40: A method of manufacturing a wearable device, including positioning a ground plane within an enclosure to define a slot antenna between a conductive portion of the enclosure and the ground plane, disposing a patch antenna comprising a substantially planar conductor within the enclosure and physically separated from the ground plane, and disposing a dynamic tuner on a printed circuit board within the enclosure, wherein the dynamic tuner is configured to adjust a center frequency of at least one of the slot antenna or the patch antenna based on at least a proximity of the wearable device to an object.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms “connected to” and “coupled to” (and their derivatives), as used in the specification and claims, are to be construed as permitting both direct and indirect (i.e., via other elements or components) connection. In addition, the terms “a” or “an,” as used in the specification and claims, are to be construed as meaning “at least one of.” Finally, for ease of use, the terms “including” and “having” (and their derivatives), as used in the specification and claims, are interchangeable with and have the same meaning as the word “comprising.”

What is claimed is:

1. A mobile electronic device, comprising:
- a display;
- an enclosure supporting the display and comprising a conductive portion;
- a ground plane positioned within the enclosure, wherein a gap defined between the conductive portion of the enclosure and the ground plane forms a slot antenna that is configured to radiate first electromagnetic signals through a portion of the display, the first electromagnetic signals radiated by the slot antenna being solely used for wireless communication in a first wireless communication band;
- a patch antenna, comprising a substantially planar conductor, that is configured to radiate second electromagnetic signals, the second electromagnetic signals radiated by the patch antenna being solely used for wireless communication in a second wireless communication band different from and non-overlapping with the first wireless communication band; and
- a battery comprising a conductive outer casing, wherein a gap defined between the conductive portion of the enclosure and the conductive outer casing of the battery forms the slot antenna that is configured to radiate the first electromagnetic signals through the portion of the display.

2. The mobile electronic device of claim 1, wherein:
- the substantially planar conductor of the patch antenna is disposed parallel and proximate to a non-conducting portion of the enclosure; and
- the patch antenna radiates through at least an outer perimeter of the non-conducting portion of the enclosure.

3. The mobile electronic device of claim 1, further comprising a printed circuit board, wherein the ground plane comprises a conductive layer of the printed circuit board.

4. The mobile electronic device of claim 1, wherein the gap between the conductive portion of the enclosure and the ground plane comprises a free space air gap having a width greater than or equal to about 1 mm.

5. The mobile electronic device of claim 4, wherein the free space air gap extends along a perimeter of the enclosure.

6. The mobile electronic device of claim 1, further comprising:
- a cradle comprising a conductive material configured for mounting the enclosure; and
- a cradle gap comprising a non-conductive material disposed between the cradle and the enclosure when the enclosure is mounted on the cradle, wherein the first electromagnetic signals radiated by the slot antenna also radiate through the cradle gap.

7. The mobile electronic device of claim 1, further comprising:
a radio frequency (RF) transceiver; and
a dynamic tuner that is configured to:
adjust a center frequency of the slot antenna by switching an impedance tuning element between the RF transceiver and the slot antenna; and
adjust a center frequency of the patch antenna by switching the impedance tuning element between the ground plane and the patch antenna.

8. The mobile electronic device of claim 7, further comprising at least one proximity sensor that is configured to determine a proximity of the mobile electronic device to a user of the mobile electronic device, wherein the dynamic tuner is configured to adjust the center frequency of at least one of the slot antenna or the patch antenna based on a state of the at least one proximity sensor.

9. The mobile electronic device of claim 1, wherein:
the enclosure further comprises a non-conductive portion disposed at a lower portion of the enclosure; and
the slot antenna is further configured to radiate the first electromagnetic signals through the non-conductive portion of the enclosure.

10. The mobile electronic device of claim 1, further comprising a display shield disposed between the display and the ground plane, wherein the display shield is configured to improve a transmission efficiency of the slot antenna by inhibiting the first electromagnetic signals from being absorbed by the display.

11. The mobile electronic device of claim 1, further comprising a display shield disposed between the display and the ground plane, wherein the display shield is configured to improve a transmission efficiency of the patch antenna by inhibiting the first electromagnetic signals from being absorbed by the display.

12. The mobile electronic device of claim 1, further comprising:
a printed circuit board;
a sensor substrate;
an isolating gap between the patch antenna and the sensor substrate; and
a flexible cable disposed in the isolating gap that connects the printed circuit board to the sensor substrate, wherein the isolating gap is configured to electrically isolate the patch antenna from the sensor substrate.

13. The mobile electronic device of claim 1, further comprising:
a printed circuit board;
a sensor substrate; and
a battery comprising a conductive outer casing, wherein:
the battery is disposed between the printed circuit board and the sensor substrate; and
the conductive outer casing of the battery is configured to create a low impedance path between the sensor substrate and the printed circuit board to inhibit ground loop interference effects on the patch antenna.

14. The mobile electronic device of claim 1, further comprising a trace feeding element disposed proximate to an inner portion of the enclosure, wherein the trace feeding element is configured to generate an electric field that capacitively couples the trace feeding element to the enclosure.

15. The mobile electronic device of claim 1, wherein the slot antenna is configured to radiate with at least one frequency in a frequency band of about 1500 MHz to about 2500 MHz.

16. The mobile electronic device of claim 1, wherein the patch antenna is configured as a monopole antenna to radiate with at least one frequency in a frequency band of about 698 MHz to about 960 MHz.

17. The mobile electronic device of claim 1, further comprising a controller that is configured to:
determine the first wireless communication band at which the slot antenna is configured to radiate;
control the radiation of the first electromagnetic signals based on the first wireless communication band;
determine the second wireless communication band at which the patch antenna is configured to radiate; and
control the radiation of the second electromagnetic signals based on the determined second wireless communication band.

18. A mobile electronic device, comprising:
a display;
an enclosure supporting the display and comprising a conductive portion;
a ground plane positioned within the enclosure, wherein a gap defined between the conductive portion of the enclosure and the ground plane forms a slot antenna that is configured to radiate first electromagnetic signals through a portion of the display, the first electromagnetic signals radiated by the slot antenna being solely used for wireless communication in a first wireless communication band; and
a patch antenna, comprising a substantially planar conductor, that is configured to radiate second electromagnetic signals, the second electromagnetic signals radiated by the patch antenna being solely used for wireless communication in a second wireless communication band different from and non-overlapping with the first wireless communication band, wherein:
the enclosure further comprises a non-conductive portion disposed at a lower portion of the enclosure; and
the slot antenna is further configured to radiate the first electromagnetic signals through the non-conductive portion of the enclosure.

19. A mobile electronic device, comprising:
a display;
an enclosure supporting the display and comprising a conductive portion;
a ground plane positioned within the enclosure, wherein a gap defined between the conductive portion of the enclosure and the ground plane forms a slot antenna that is configured to radiate first electromagnetic signals through a portion of the display, the first electromagnetic signals radiated by the slot antenna being solely used for wireless communication in a first wireless communication band;
a patch antenna, comprising a substantially planar conductor, that is configured to radiate second electromagnetic signals, the second electromagnetic signals radiated by the patch antenna being solely used for wireless communication in a second wireless communication band different from and non-overlapping with the first wireless communication band; and
a display shield disposed between the display and the ground plane, wherein the display shield is configured to improve a transmission efficiency of at least one of the slot antenna or the patch antenna by inhibiting the first electromagnetic signals from being absorbed by the display.

* * * * *